(12) United States Patent
Do et al.

(10) Patent No.: US 7,208,212 B2
(45) Date of Patent: Apr. 24, 2007

(54) LABEL APPLICATOR SYSTEM

(75) Inventors: Sung Do, Fullerton, CA (US); Jerry G. Hodsdon, Forestdale, MA (US); Galen C. Wong, Pasadena, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/964,378

(22) Filed: Oct. 12, 2004

(65) Prior Publication Data
US 2005/0048244 A1    Mar. 3, 2005

Related U.S. Application Data

(62) Division of application No. 09/575,396, filed on May 22, 2000, now Pat. No. 6,803,084.

(51) Int. Cl.
*B32B 9/00* (2006.01)
(52) U.S. Cl. ............... 428/42.3; 40/642.02; 40/654.01; 283/36; 283/37; 283/38; 283/41; 402/79; 428/40.1; 428/43
(58) Field of Classification Search ............... 428/40.1, 428/42.3, 43; 283/36, 37, 38, 41; 402/79; 40/642.02, 654.01
See application file for complete search history.

(56) References Cited

U.S. PATENT DOCUMENTS

| | | | |
|---|---|---|---|
| 3,039,218 A | 6/1962 | Whiting et al. | |
| 3,316,709 A | 5/1967 | Edwards | |
| 3,421,239 A | 1/1969 | Smith | |
| 3,885,070 A | 5/1975 | Chapman | |
| 3,924,744 A | 12/1975 | Heimann | |
| 3,925,585 A | 12/1975 | Aoyagi | |
| 4,032,687 A | 6/1977 | Hornsby, Jr. | |
| 4,317,852 A | 3/1982 | Ogden | |
| 4,478,666 A | 10/1984 | Ogden | |
| 4,584,219 A | 4/1986 | Baartmans | |
| 4,802,575 A * | 2/1989 | Martin | 206/232 |
| 4,932,683 A * | 6/1990 | Perazza | 283/74 |

(Continued)

*Primary Examiner*—Nasser Ahmad
(74) *Attorney, Agent, or Firm*—Jeffer Mangels Butler & Marmaro LLP

(57) ABSTRACT

A label applicator kit comprising a holder including first holding means for holding a first set of tabbed materials such that the tabs of the first set are staggered, exposed and in a first line and a second holding means for holding a second set of tabbed materials such that the tabs of the second set are staggered, exposed and in a second line that is parallel to and spaced from the first line. The holder being a pouch, the first holding means being a first pocket of the pouch and the second holding means being a second pocket of the pouch. The pouch being in a sets-holding condition when the first holding means is holding the first set and the second holding means is holding the second set. A label applicator sheet including first and second rows of labels, and the label applicator sheet being configured and capable of being positioned in a label application position relative to the pouch, when the pouch is in the sets-holding condition, wherein each of the labels of the first row of labels is aligned with and can be applied directly to a respective tab of the first set and each of the labels of the second row of labels is aligned with and can be applied directly to a respective tab of the second set.

18 Claims, 20 Drawing Sheets

U.S. PATENT DOCUMENTS

| | | |
|---|---|---|
| 5,135,261 A | 8/1992 | Cusack et al. |
| 5,182,152 A | 1/1993 | Ericson |
| 5,227,209 A | 7/1993 | Garland |
| 5,340,427 A | 8/1994 | Cusack et al. |
| 5,389,414 A | 2/1995 | Popat |
| 5,462,783 A | 10/1995 | Esselmann |
| 5,484,168 A | 1/1996 | Chigot |
| 5,662,976 A | 9/1997 | Popat et al. |
| 5,799,982 A | 9/1998 | McClure et al. |
| 5,881,597 A | 3/1999 | Brooks |
| 5,924,561 A | 7/1999 | Baumgartner et al. |
| 5,947,525 A | 9/1999 | Pollman |
| 5,958,536 A | 9/1999 | Gelsinger et al. |
| 5,997,683 A | 12/1999 | Popat |
| 6,081,501 A | 6/2000 | Hunter et al. |

* cited by examiner

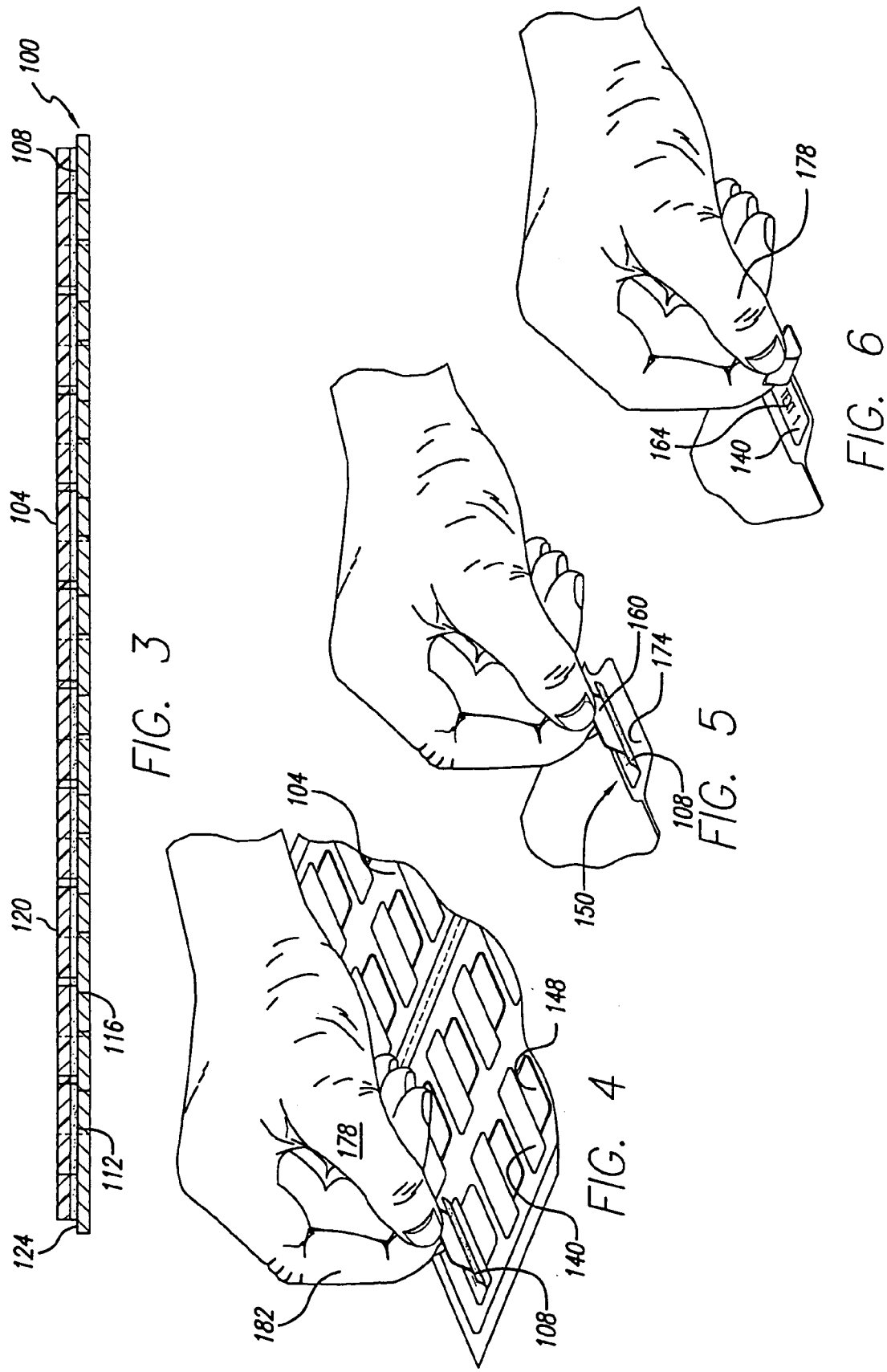

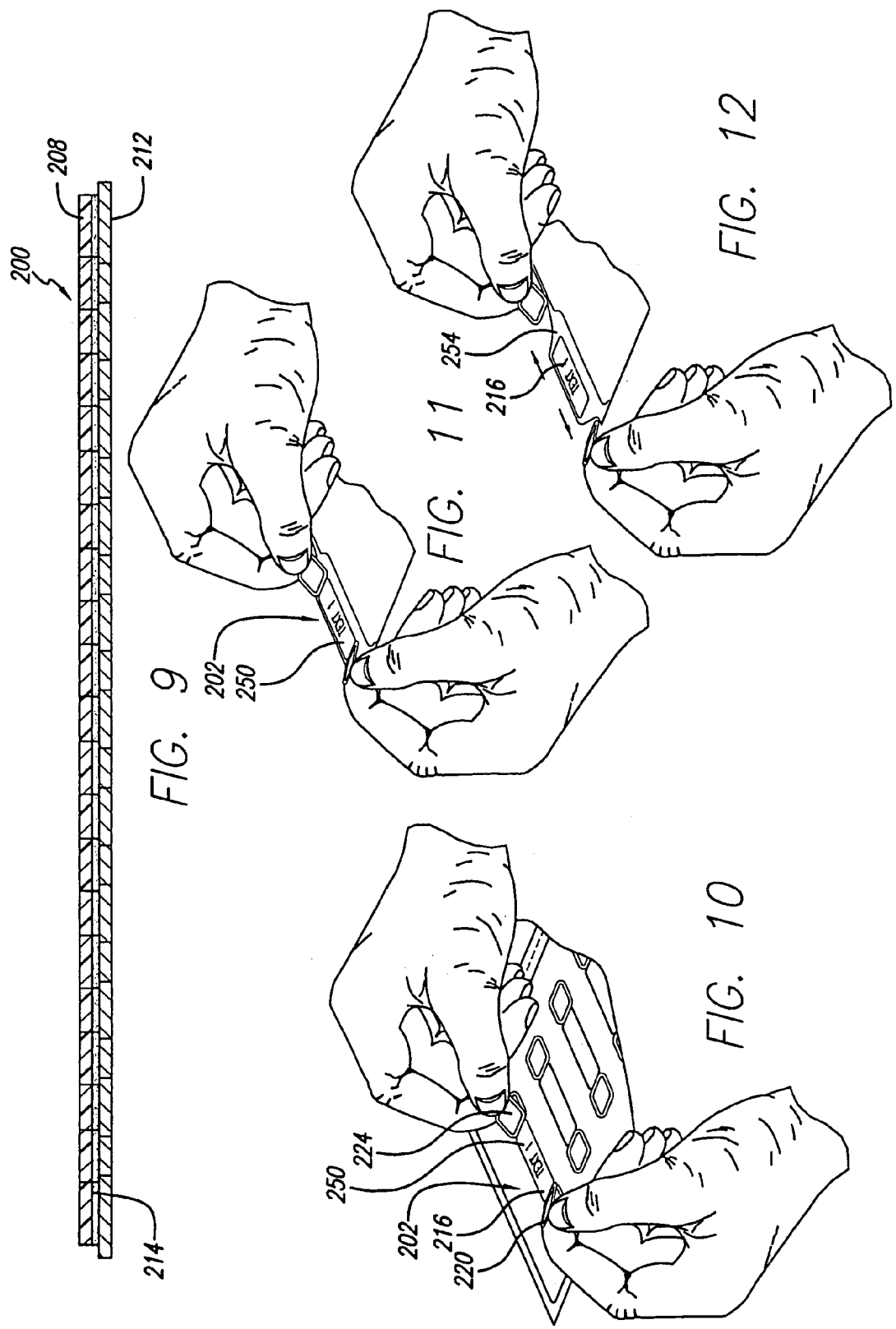

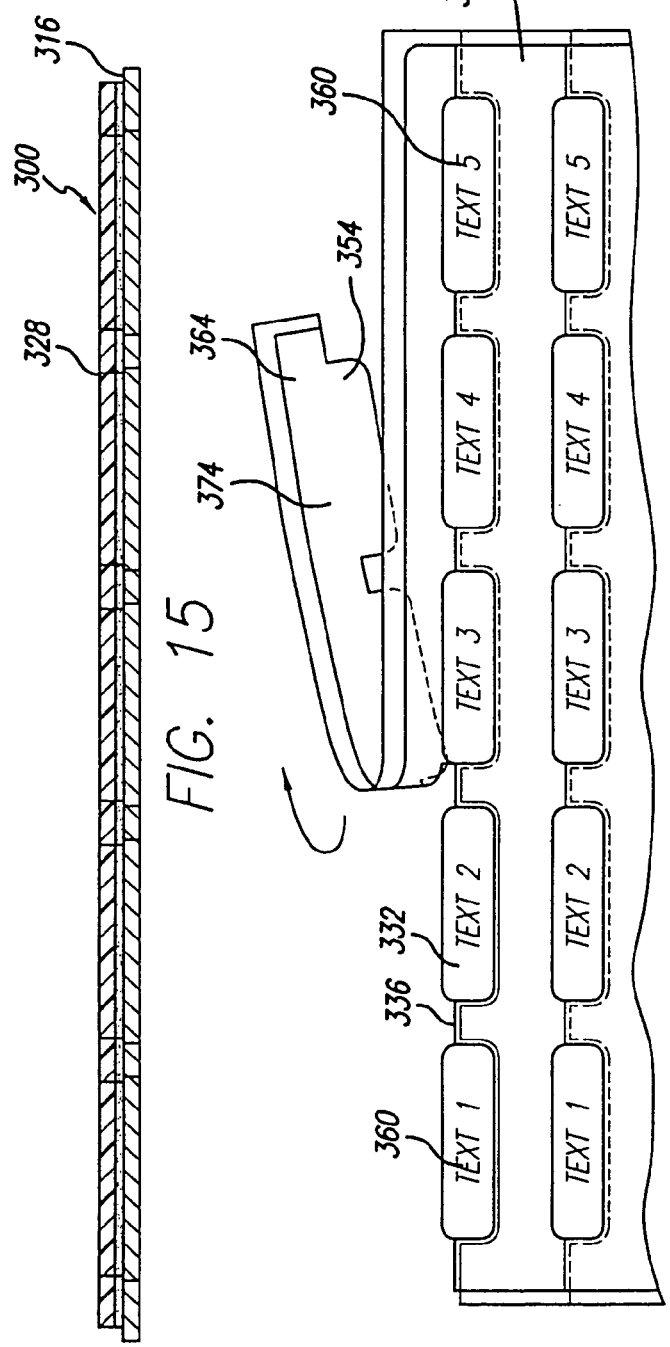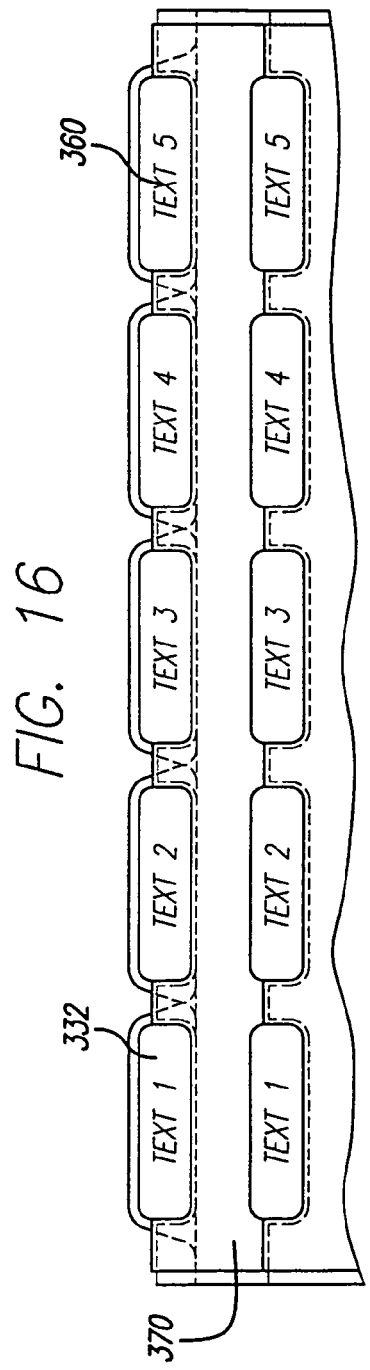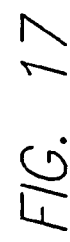

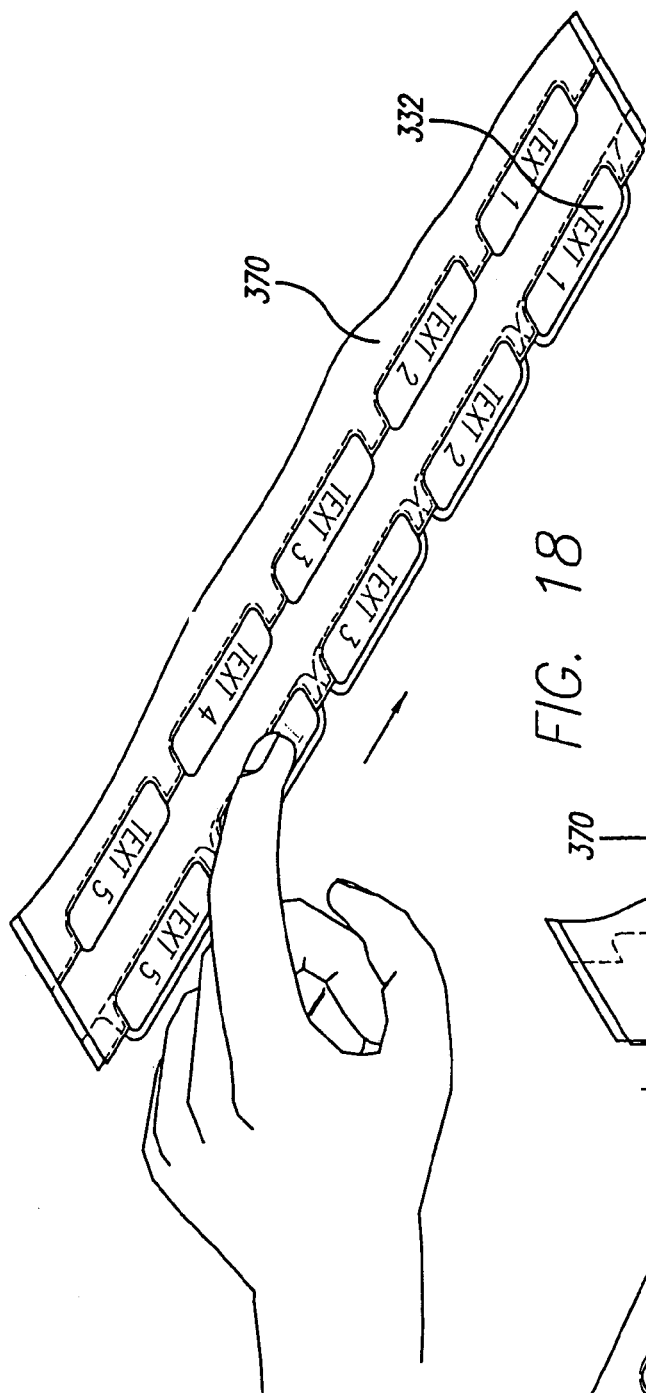
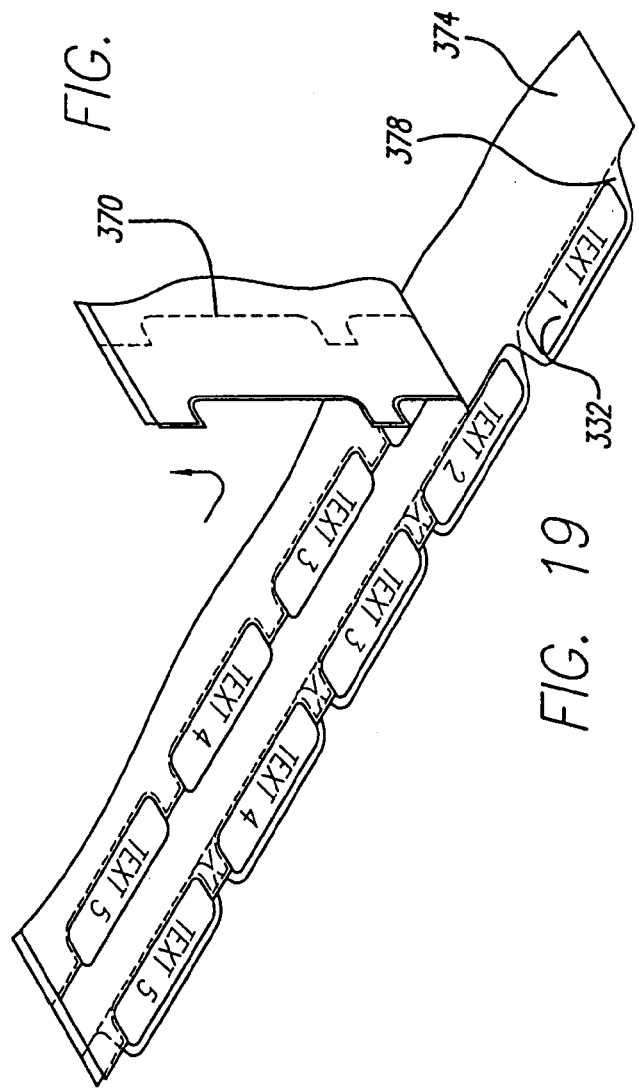
FIG. 18
FIG. 19

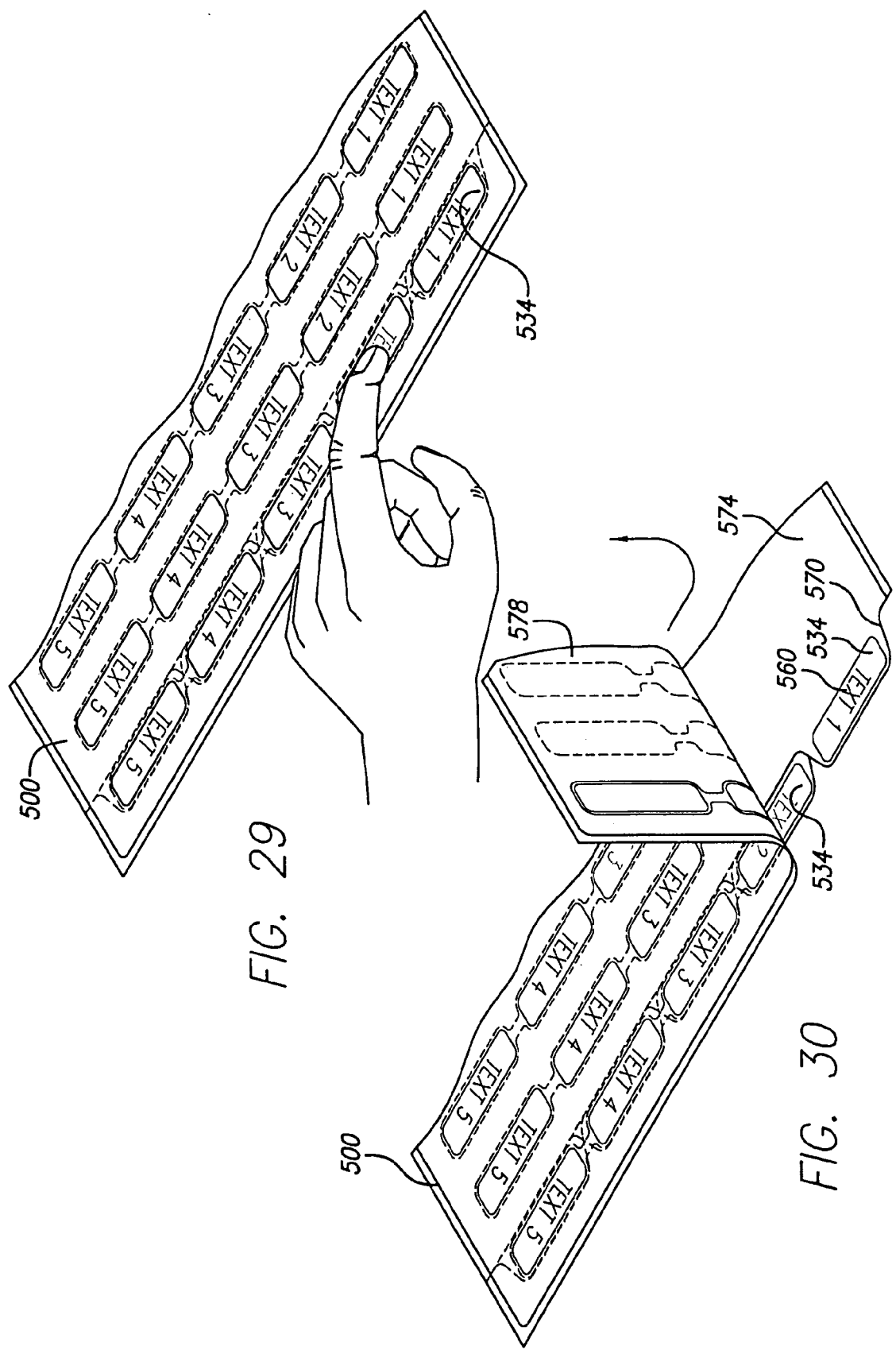

LABEL APPLICATOR SYSTEM

CROSS-REFERENCE TO RELATED APPLICATION

This is a divisional of U.S. patent application Ser. No. 09/575,396, filed May 22, 2000, which issued as U.S. Pat. No. 6,803,084 on Oct. 12, 2004 and whose entire contents are hereby incorporated by reference.

BACKGROUND OF THE INVENTION

The present invention relates to sheet constructions, systems and methods for applying labels to tabs of divider sheets, to tabs of file folders, to envelopes and the like.

One known label application method and system is provided in the INDEX MAKER Clear Label Dividers product available from Avery Dennison Corporation of Pasadena, Calif. This product includes a sheet having columns of clear labels thereon attached with adhesive to a releasable liner sheet. The clear tab labels are formatted using preset layouts and existing word processing software. The tab titles are printed onto the clear label sheet using laser or inkjet printers. The printed tabs are then manually peeled off from the sheet and individually applied to the divider tabs. This system allows the user to individually custom design and print each of the tabs with the desired indicia. The clear labels virtually disappear on the divider tabs giving the dividers a clean, professional look. Formatting can use preset layouts and existing software programs such as MICROSOFT Word for Windows, COREL Word Perfect for Windows, COREL Word Perfect for DOS, LOTUS Word Pro, and LOTUS AMI Pro. The following U.S. Patents are related to this prior art product: U.S. Pat. Nos. 5,135,261, 5,340,427 and 5,389,414. (All patents and other publications mentioned anywhere in this disclosure are hereby incorporated by reference in their entireties.)

Application of these labels can be time consuming, clumsy and subject to error, since they must be separated and then attached individually to the corresponding divider tabs. In the process of individually applying them, they often are not applied evenly or properly with the divider tab sheets. In other words, the above-described INDEX MAKER product has the problem that the labels are difficult and time consuming to remove from the backing sheet and to place and align on the tabs so they are straight. They are also small and cumbersome to handle.

Accordingly, a method for remedying these problems was designed and provided in U.S. Pat. No. 5,947,525 to Pollman. The Pollman patent teaches using at least one set of precut labels removably attached to carrier strips that are removably secured to a backing sheet. The precut labels are spaced apart on the carrier strips to align substantially on the tabs on the divider sheets. The user can separate a carrier strip and precut labels affixed thereto from the packing sheet, place and align the carrier strip across the divider sheet such that the precut labels are placed on the tabs of the divider sheets. He then pulls the carrier sheet upwardly and away from the divider sheet such that the precut labels separate from the carrier strip and remain on the divider's tabs. This system, while an improvement in certain respects over the prior art, has the disadvantage that the strips are typically flimsy and difficult to properly align. Additionally, the carrier strip can be sticky and thus may stick to unwanted surfaces.

SUMMARY OF THE INVENTION

Accordingly, directed to remedying the disadvantages of the prior art, various label applicator constructions are provided herein. Each includes facestock adhered with releasable adhesive to a liner sheet. Die cut lines are made through the facestock but not through the liner sheet; and die cut lines are made through the liner sheet but not the facestock. Portions of the label sheet are then stripped away. Using different patterns of the die cut lines or other weakened separation lines and stripped away portions, the different label applicator constructions are formed. Each is a sheet construction with a plurality of small elongate labels formed from the liner sheet and releasably held to the facestock. The sheet construction is passed through a printer and the desired indicia printed on the labels. The printed labels are then ready for easy controlled removal and application by the user to tabs of index dividers, file folders or the like.

According to one definition of the invention, the label sheet is die cut on both the face and liner to facilitate the application of labels onto the dividers and file folders. The label sheet has die cuts that are oriented thereon to allow them to be aligned with either one or more sets of dividers or sets of file folders. The liner is die cut so that a strip can be removed directly from behind the labels, exposing the adhesive side of the labels. The labels are also temporarily held onto the remainder of the sheet by small ties. Removal of the liner from the label sheet allows the user to align the tabs over the substrate using the rest of the label sheet as a carrier. The application of the labels is followed by removal of the label sheet that breaks the ties, leaving just the labels on the substrate. The label applicator construction includes a pressure sensitive laminate material die cut on both the face and liner and sheeted to a standard-size sheet. The facestock of the pressure sensitive laminate material can be either paper or coated film that is toner or ink receptive. The adhesive can be permanent or removable, depending on the level of adhesion needed for the end user.

A first construction/method of the invention is for applying multiple labels on tab dividers/file folders. The label sheet includes die cuts that are oriented on the sheet in a way that allows them to be aligned with the set of tabs if a set of dividers were stacked on top of each other. The liner is die cut so that a strip, positioned directly behind the labels, can be removed, exposing the adhesive side of the labels. The labels are also temporarily held on the label sheet by small ties. The removal of the liner from the label sheet allows the user to align the tabs over the divider set using the label sheet as a carrier. Once the labels are affixed to the tabs, the user pulls away the label sheet to break the ties, leaving only the labels affixed to the tabs.

An alternate method for placing multiple label on tab dividers/file folders uses a label sheet which includes labels arranged in a way similar to the first method. In this method, the liner is die cut in the shape of the row of labels. The labels are exposed by removing the strip of liner directly behind the labels. Next, a set of dividers is placed on the exposed adhesive using the outline of the removed liner as a guide. After the labels have been pressure applied to the tabs, the label sheet is pulled away, leaving the labels affixed to the tabs.

A second construction/method is for applying single labels onto substrate. In this method, individual labels are placed on the substrate one label at a time. On both short sides of the label, there are "handles" that are held onto the label by small ties. These handles are used to hold the labels over the desired position and used to align the labels. After placing the labels on the desired location, the handles are removed by pulling laterally away from the label.

An alternate construction/method uses a single "handle" on the label. In this method, individual labels are placed on the substrate by using a single handle as an alignment tool. The handles are once again held onto the labels by small ties that are designed to be broken after the label has been placed in its desired location.

A third construction/method uses multiple sets of tab dividers placed in a device that uses pouches that are tiered. A set of dividers is placed in each of the pouches. The dividers are positioned such that when a label sheet, such as the one described in the first method, is aligned with the top row of tabs, all others will also be aligned. This allows the user to label multiple sets of dividers in a single operation.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 3 is an enlarged cross-sectional view taken on line 3—3 of FIG. 1;

FIG. 4 is a perspective view of a first application step by a user of a label unit of the construction of FIG. 1;

FIG. 5 is a perspective view of a second application step;

FIG. 6 is a perspective view of a third application step;

FIG. 9 is an enlarged cross-sectional view taken on line 9—9 of FIG. 7;

FIG. 10 is a perspective view showing a first application step by a user of a label unit of the construction of FIG. 7;

FIG. 11 is a perspective view of a second application step;

FIG. 12 is a perspective view of a third application step;

FIG. 15 is an enlarged cross-sectional view taken on line 15—15 in FIG. 13;

FIG. 16 is a perspective view of a top portion of the construction of FIG. 13 showing a first step for applying a first series of printed labels thereof;

FIG. 17 is a perspective view of a second step;

FIG. 18 is a perspective view of a third step;

FIG. 19 is a perspective view of a fourth step;

FIG. 29 is a perspective view of a third step;

FIG. 30 is a perspective view of a fourth step;

DETAILED DESCRIPTION OF PREFERRED EMBODIMENTS OF THE INVENTION

A number of different label applicator constructions of the present invention are disclosed herein and will now be described. Generally speaking, each is formed as a sheet construction having a liner sheet with a facestock attached to the back side thereof. One embodiment is to form the sheet construction as a laminate having an ink and/or laser receptive top coat facestock laminated with pressure sensitive adhesive to a release-coated paper liner. The facestock has weakened separation lines formed therein to define a plurality of facestock labels. And weakened separation lines in the liner sheet form the liner sheet so it can be separated into portions to assist in the proper placement of the facestock labels on the tabs of the index dividers, file folders or the like. More particularly, the weakened separation lines of the liner sheet allow the liner sheet to be separated such that one or more portions of the liner sheet can be manually handled by the user in the placement of the facestock labels so that he need not touch the labels. Additionally, the liner sheet portions thereby defined help the user properly position the facestock label(s) on the tab(s). As will become apparent from the following detailed descriptions, some of the embodiments herein allow the user to individually remove and manipulate labels and others allow for an entire line or row of labels to be essentially simultaneously applied to a line of stacked, staggered tabs in a manner that is an improvement over the problems experienced with the Pollman method.

The weakened separation lines can be formed by generally any known method. A preferred method for many of the lines is to die cut them. Each of the die cut lines typically will penetrate only one of the liner sheet or the facestock sheet. And the die cut portions of the liner sheet or facestock sheet are maintained on the label applicator sheet construction by the adhesive so that they will not separate from the sheet while the sheet is being passed through a printer or copier. Instead of die cutting, the weakened separation lines can be formed by perforated lines or other means as would be apparent to those skilled in the art.

Figure 1:
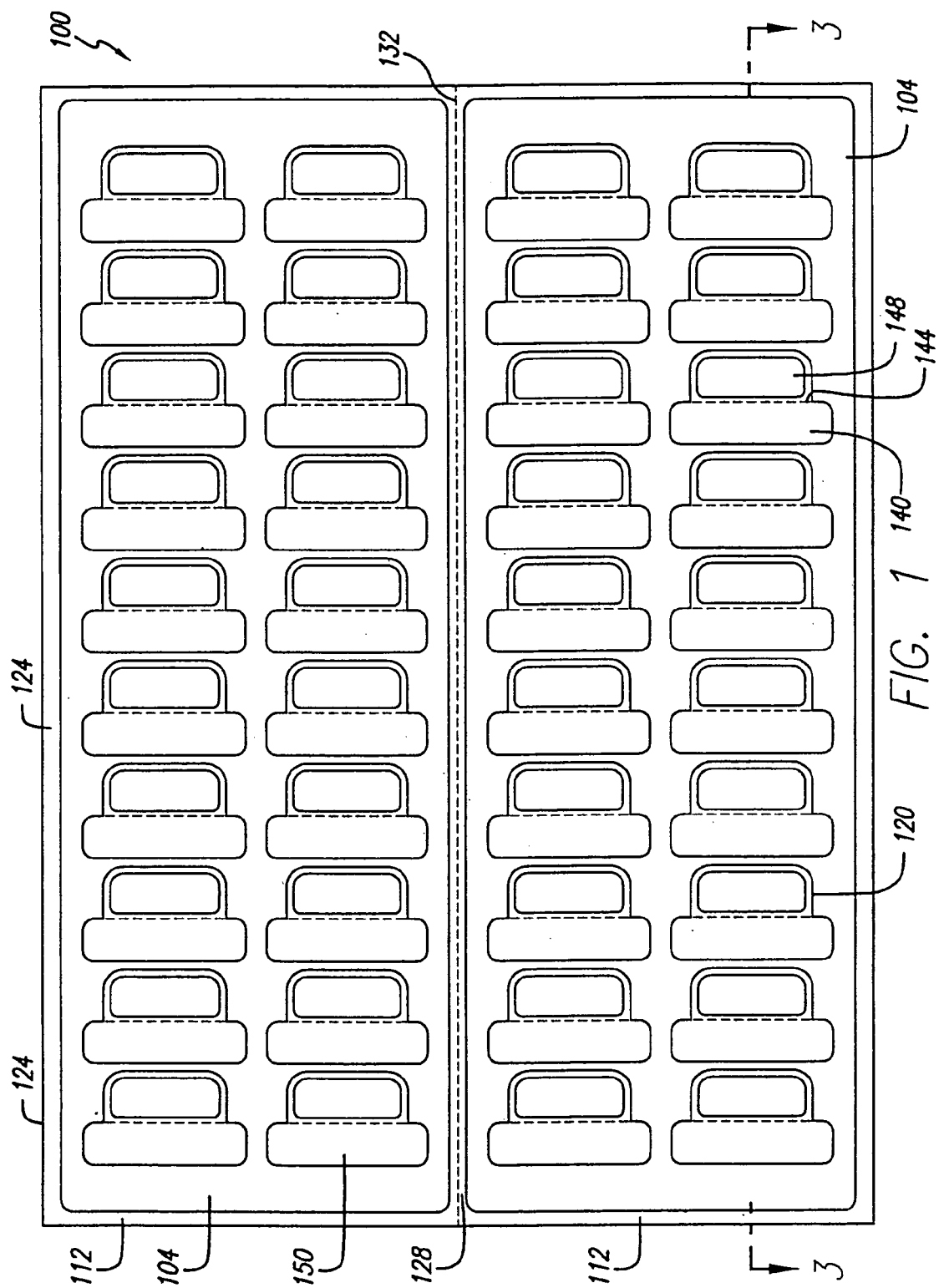
FIG. 1 is a front view of a first label applicator construction of the present invention.
Figure 2:
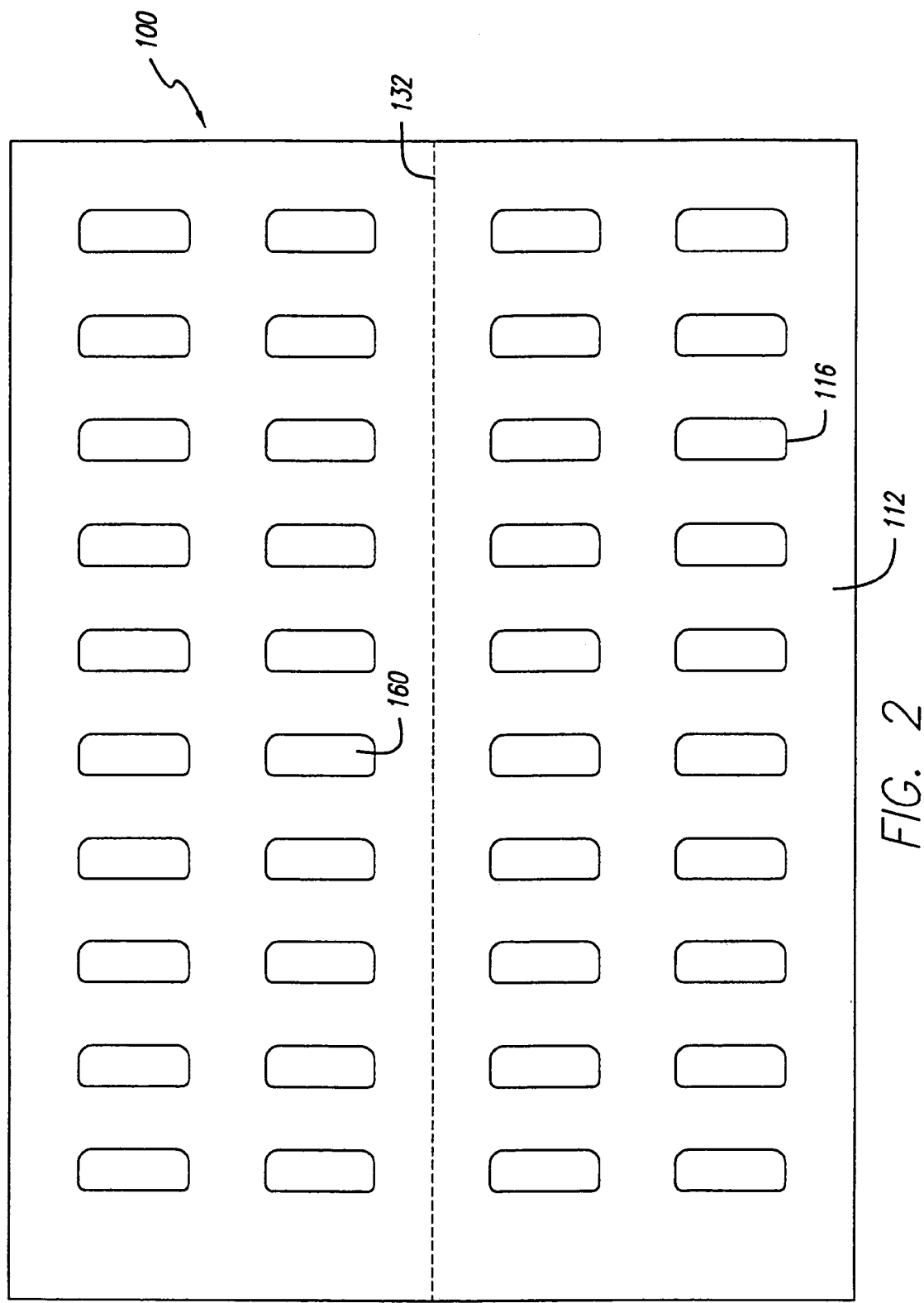
FIG. 2 is a rear view of the construction of FIG. 1.
Figure 7:
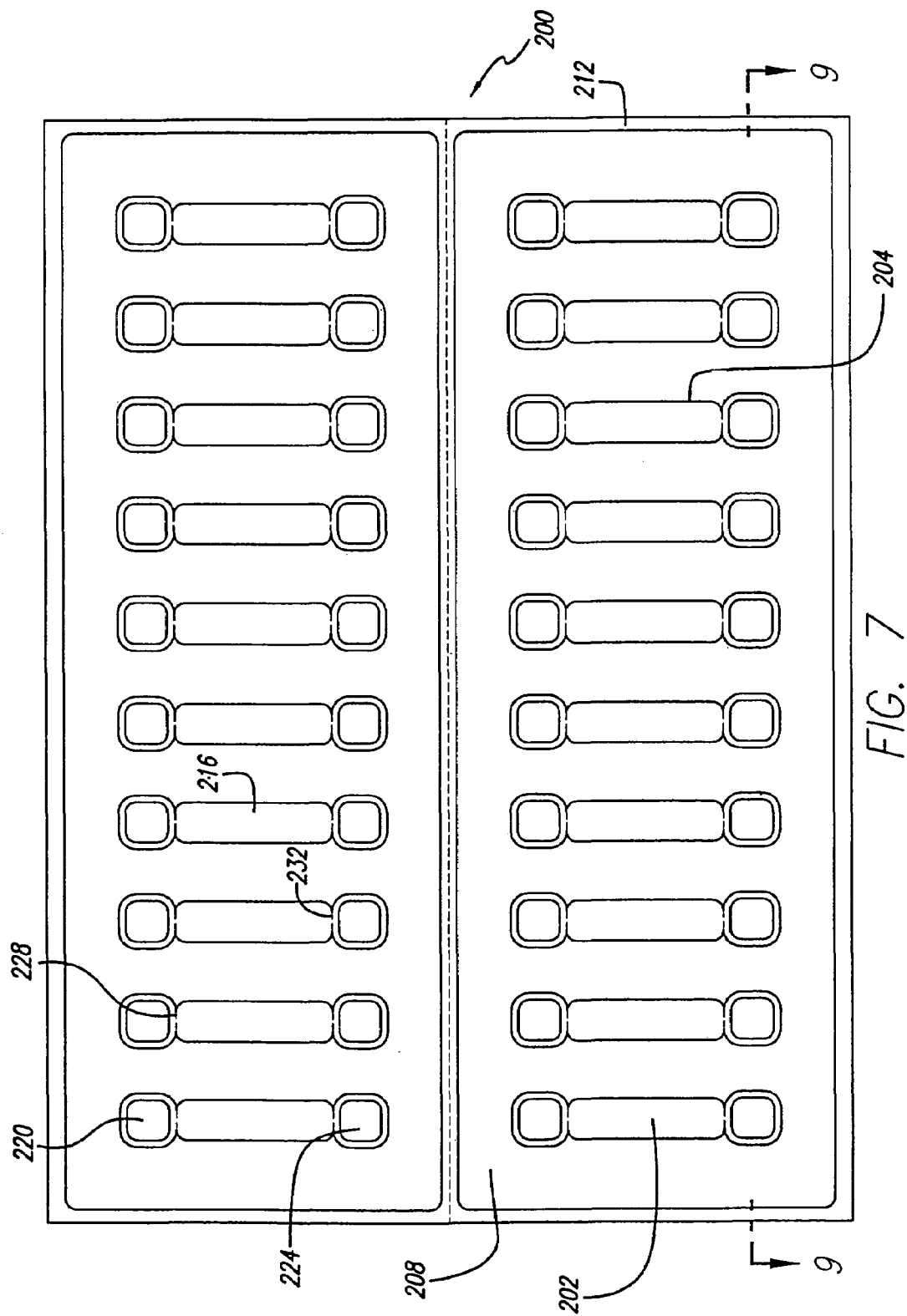
FIG. 7 is a front view of a second label applicator construction of the present invention.
Figure 8:
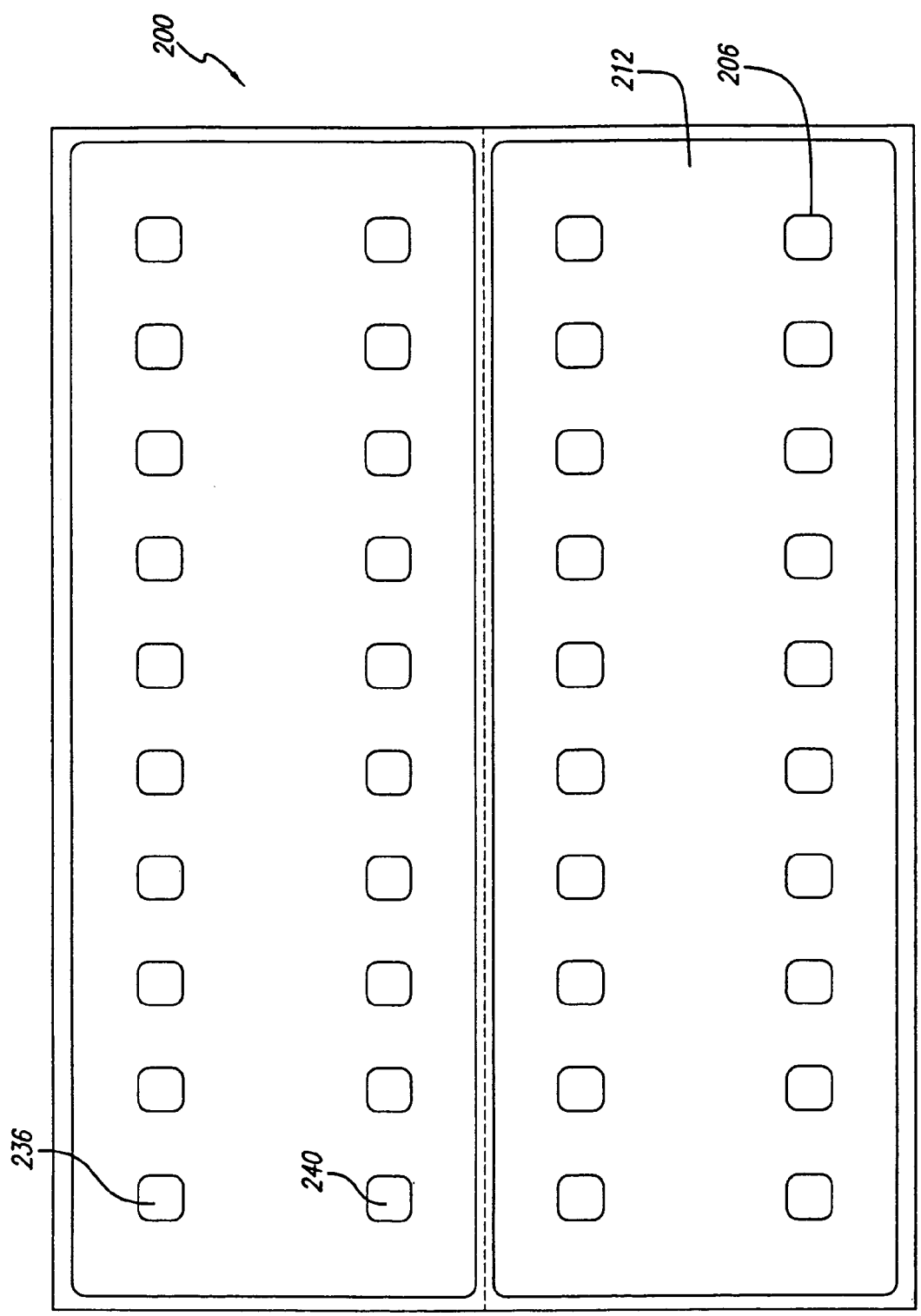
FIG. 8 is a rear view of the construction of FIG. 7.

A first label applicator construction of the present invention is shown in FIGS. 1 through 6, generally at 100. It can be understood from FIG. 3 that the facestock sheet 104 is attached with adhesive 108 to the liner sheet 112. Both the liner sheet 112 and the facestock 104 have die cut lines. The pattern for the die cut lines 116 of the liner sheet 112 is best shown in FIG. 2, which is the rear view of the sheet. FIG. 1 then shows the pattern of the die cut lines 120 in the facestock 104; and as can be understood therein and also from FIG. 3, portions of the facestock have been stripped away to form the edge margins 124 of the construction.

These margins are provided to reduce the curl on the label sheets. Additionally, a gutter strip 128 has been removed from the center and a perforation line 132 formed down the center of the liner sheet 112. This allows the construction 100 to be divided into two parts by the user. Two smaller label applicator construction sheets are thereby formed for passing through the printer or as may be desired by the user.

Referring to FIG. 1, the facestock sheet is cut by the die cut lines 120 into four columns of ten rows of labels. Of course, different numbers of columns and rows or different patterns (non-matrix) of the labels can be used as needed. Each of the facestock labels has a two part construction, each having a large rounded corner rectangle 140 attached with a perforated line or ties 144 to a smaller rounded corner rectangle 148. And the liner sheet is then cut to define a similar number of columns and rows of small rounded corner rectangles 160, each positioned on the back of the respective rounded corner rectangles 144 of the label and adhered thereto by the adhesive 108. The smaller facestock label rectangle 148 defines a handle portion of the label unit 150, and the larger rectangle 140 defines the actual facestock label of the unit 150 on which indicia 164 is printed. A respective liner sheet 160 rectangle is adhered to this handle portion 148 of the unit 150.

Figure 26:
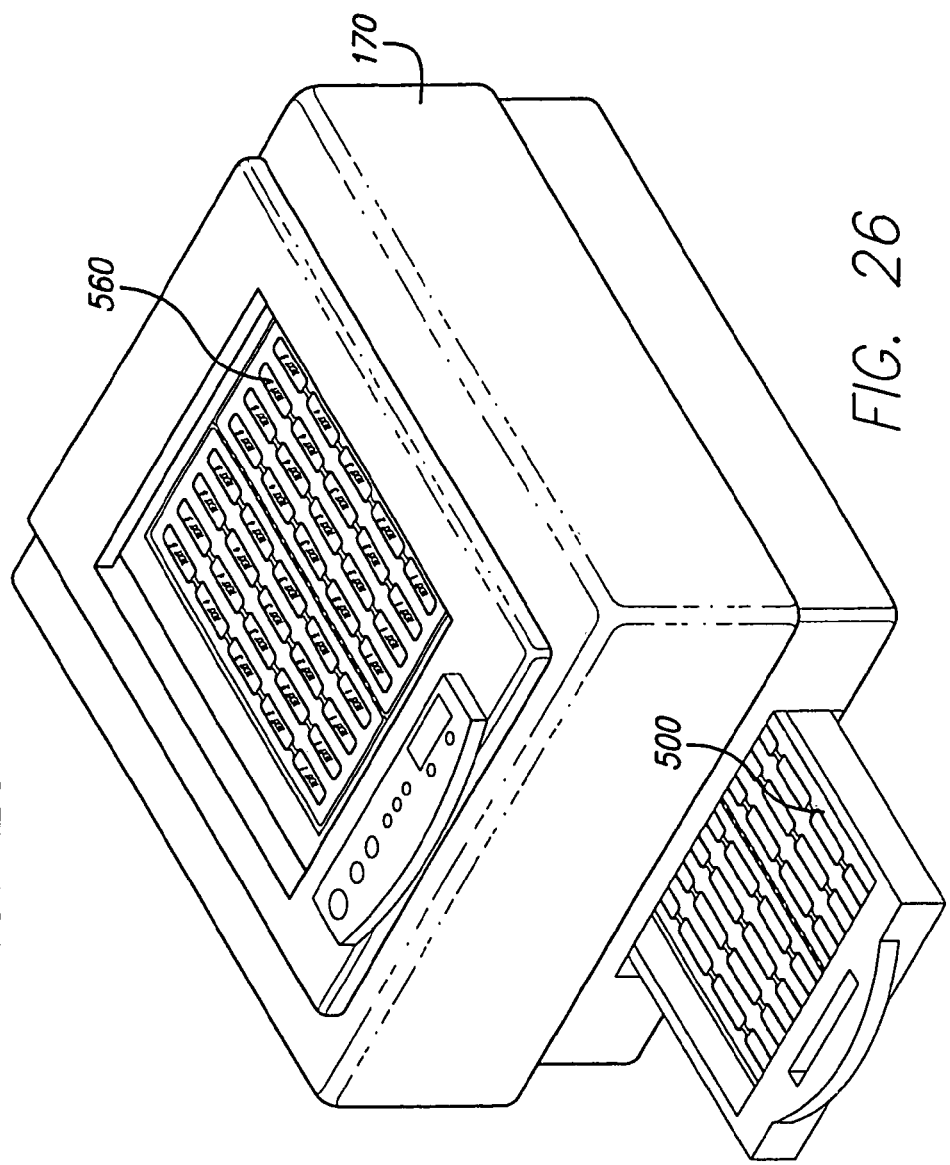
FIG. 26 is a perspective view of the construction of FIG. 23 passing through a printer.

The sheet construction 100 is passed through a printer or a copier, such as shown in FIG. 26 at 170. And the desired indicia 164 are printed on the facestock label portion 140 of the unit 150. It is anticipated that all of the facestock labels 140 will be printed in a single pass through the printer 170. However, it is within the scope of the invention to print less than all of them and then pass the sheet through a second, third, or more times to print on the remaining labels. Alternatively, the user can hand write on some or all of the labels 140.

After the label 140 has been printed, or handwritten thereon, with the desired indicia 164, the label unit 150 is pulled off the rest of the sheet, as shown in FIG. 4, by the user grasping the liner sheet portion 160 and the handle portion 148 and removing them along their die cut lines from the surrounding liner sheet and facestock sheet and pulling the label portion 140 off of the underlying liner sheet with adhesive 108 remaining on the bottom portion of the label. The user then manipulates the label portion 140 into a desired position on the tab 174 by holding and manipulating the facestock handle portion and the attached liner sheet portion, as shown in FIG. 5, between his thumb 178 and forefinger 182. The label 140 is then pressed down by the user and adhered with the adhesive 108 in the desired position on the tab 174. The handle portion with liner sheet portion attached thereto are separated from the printed adhered label by tearing along the perforation line or ties 144 as shown in FIG. 6. Thereby the printed label 140 is accurately positioned by the user and without the user touching the label portion and thereby dirtying it or smudging it with body oils from the user's fingers or the user's fingers adhering to the adhesive.

FIGS. 7 through 12 illustrate a second label applicator construction of the present invention generally at 200. It is seen therein that it is conceptually similar to the construction 100 in that removable label units 202 are defined by die cut lines 204, 206 in the facestock 208 and in the liner sheet 212, and adhesive 214 is provided between the sheets. However, instead of the facestock portion being formed by a large elongate rectangle defining the label with a smaller elongate rectangle parallel thereto along a side edge defining the handle portion, a different configuration is shown in construction FIG. 7. Although the unit 202 of FIG. 7 includes a similar elongate rectangular facestock label 216, facestock handle portions 220, 224 are formed at each end thereof and with perforation lines or ties 228, 232 between the ends of the facestock label and both of the handle portions. Similarly, liner sheet portions 236, 240 are die cut on the backs of each of the facestock handle portions 220, 224, respectively. The liner sheet portions 236, 240 have slightly smaller dimensions than the respective handle portions 220, 224, defining a thin facestock margin about the perimeter of the liner sheet portions.

After the sheet 200 has been passed through a printer or a copier and the desired indicia 250 printed on the labels 216, as shown in FIG. 10, the two end handle portions 220, 224 and liner sheet portions 236, 240 are grasped and pulled away from the sheet and the facestock label 216 peeled off from the liner sheet 212 with a layer of adhesive on the back of the label. With the two handle portions grasped by the user, the label unit 204 is positioned such that the label 216 is in the desired position on the tab 254 as shown in FIG. 11, and the label 216 is then pressed into position. The two handle portions 220, 224 are then pulled away along the perforation lines 228, 232 from the ends of the adhered label, as depicted in FIG. 12. Thereby, similar to the sheet 100, the facestock label 216 itself is never touched by the user.

Referring to FIGS. 13 through 19, a third label applicator construction sheet of the present invention is shown generally at 300. It is seen also to comprise a liner sheet 304 and a facestock 308 attached with adhesive 312 to the face of the liner sheet. Similar to the other constructions disclosed herein, margin edges 316 of the facestock have been cut and removed as well as a center gutter portion 320 and a perforation line 324 through the liner sheet and down the middle of the liner sheet as formed. The facestock has been die cut to form lines 328 of spaced rounded corner rectangular labels 332, each connected to adjacent labels with thin strips 336 and with the die cut line extending from the end labels to the edge of the facestock. The liner sheet 304 is die cut 340 with end lines extending all the way to but spaced a small distance to form a small break-away tie at the edge of the sheet. The die cut lines extend in a distance and then extend down, across and up, parallel to the outer shape of the adjacent label but spaced outwardly a slight distance therefrom and extending out to form a small plateau 350 between adjacent labels similar to the spacing on the facestock sheet between the adjacent labels. The label liner sheet portions 354 are adhered to respective ones of the facestock labels 332 while the sheet is intact and passed through the printer or copier.

After passing therethrough and with desired indicia 360 printed on the labels 332, the liner strip 364 at the top of the sheet is pulled away and separated from the remainder portion 370 of the sheet. The liner sheet portions mentioned above are removed with the liner sheet strip together with a liner sheet bar at the top 374. This step is shown in FIG. 16. The adhesive connection between the facestock and the liner sheet and the small ties at the end of the liner sheet cut lines, hold the sheet intact and prevent the liner strip 364 from separating before it is manually pulled away by the user after the printing. When it has been pulled away, the liner sheet portions 354 on the backs of the respective facestock labels 332 are removed thereby exposing the adhesive back sides of the line of labels 332 at the top of the remaining sheet portion 370. The top row of exposed labels 332 extends a slight distance out from the top edge of the sheet. The large remaining sheet portion 370 can then be manipulated by the user into the desired position aligned with the set of tab dividers 374 or file folders with their staggered tab 378. The body portion 370 provides a strong, not flexible or flimsy, handle for manipulating and accurately positioning the top row of exposed labels onto the desired positions on the staggered tabs as shown in FIG. 17.

Each of the properly positioned labels 332 is then pressed flat down to form a strong adhesive bond onto the respective tabs 378 as depicted in FIG. 18. The body handle portion 370 of the sheet is then pulled away from the adhered labels 332, breaking the thin facestock ties between the adjacent labels and leaving the labels in position. Referring back to FIG. 15, the next top liner strip is removed to expose the backsides of the second line of printed labels. The second line of printed labels are then manipulated into position on a second set of staggered dividers, the labels pressed into position and the remaining smaller body portion removed. This can be understood by again viewing FIGS. 17 through 19.

Figure 13:
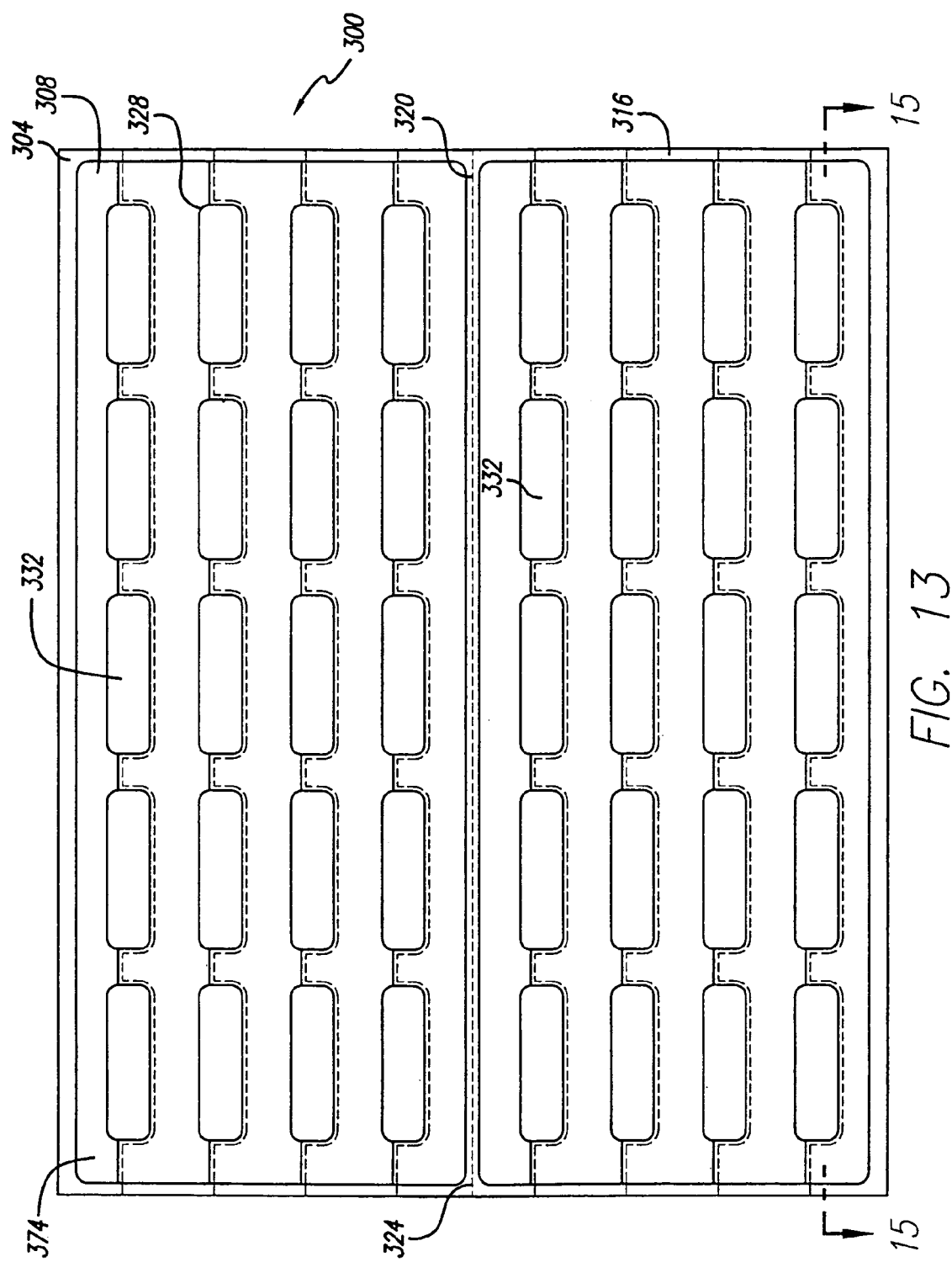
FIG. 13 is a front view of a third label applicator construction of the present invention.
Figure 14:
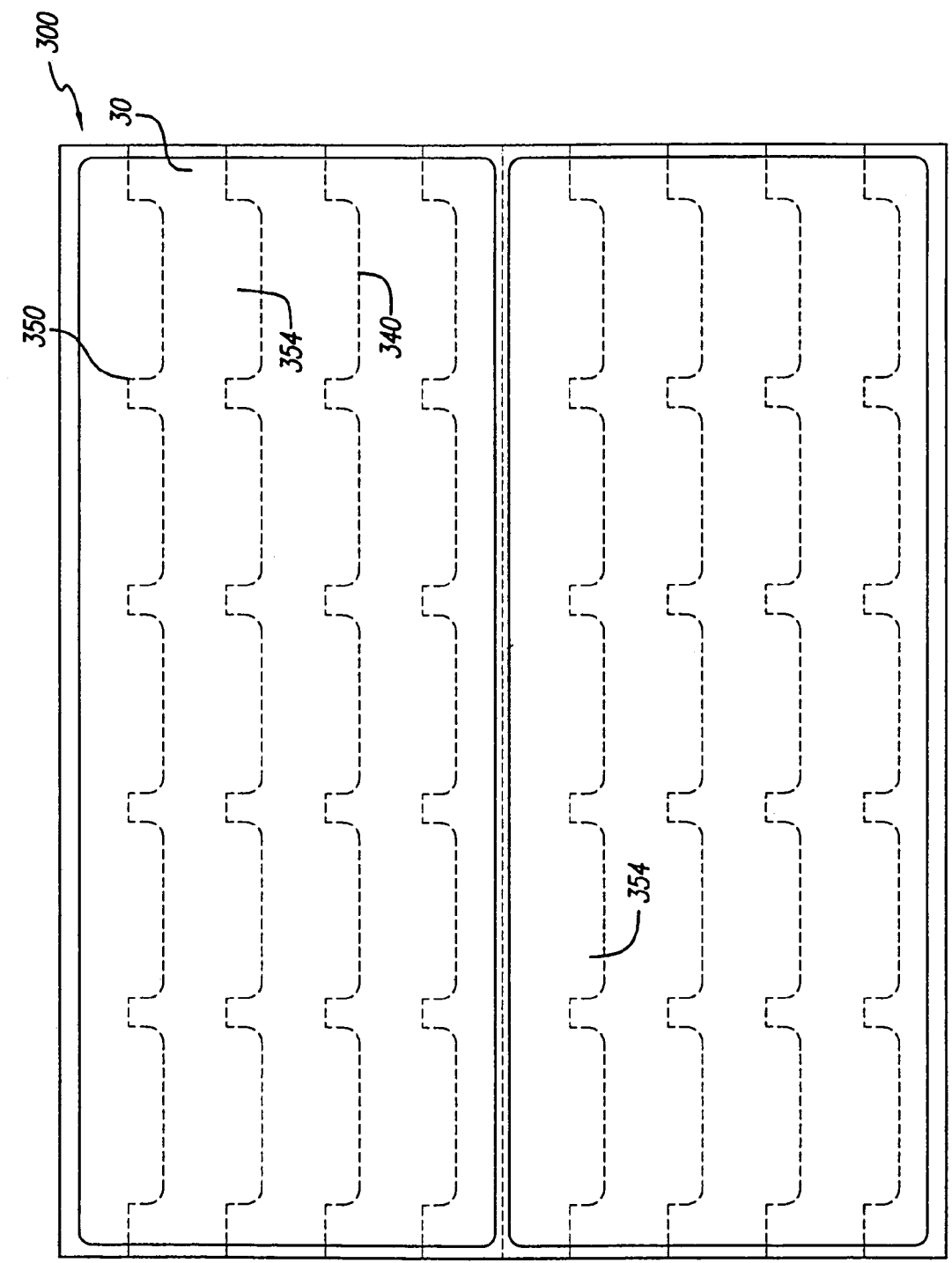
FIG. 14 is a rear view of the construction of FIG. 13.
Figure 20:
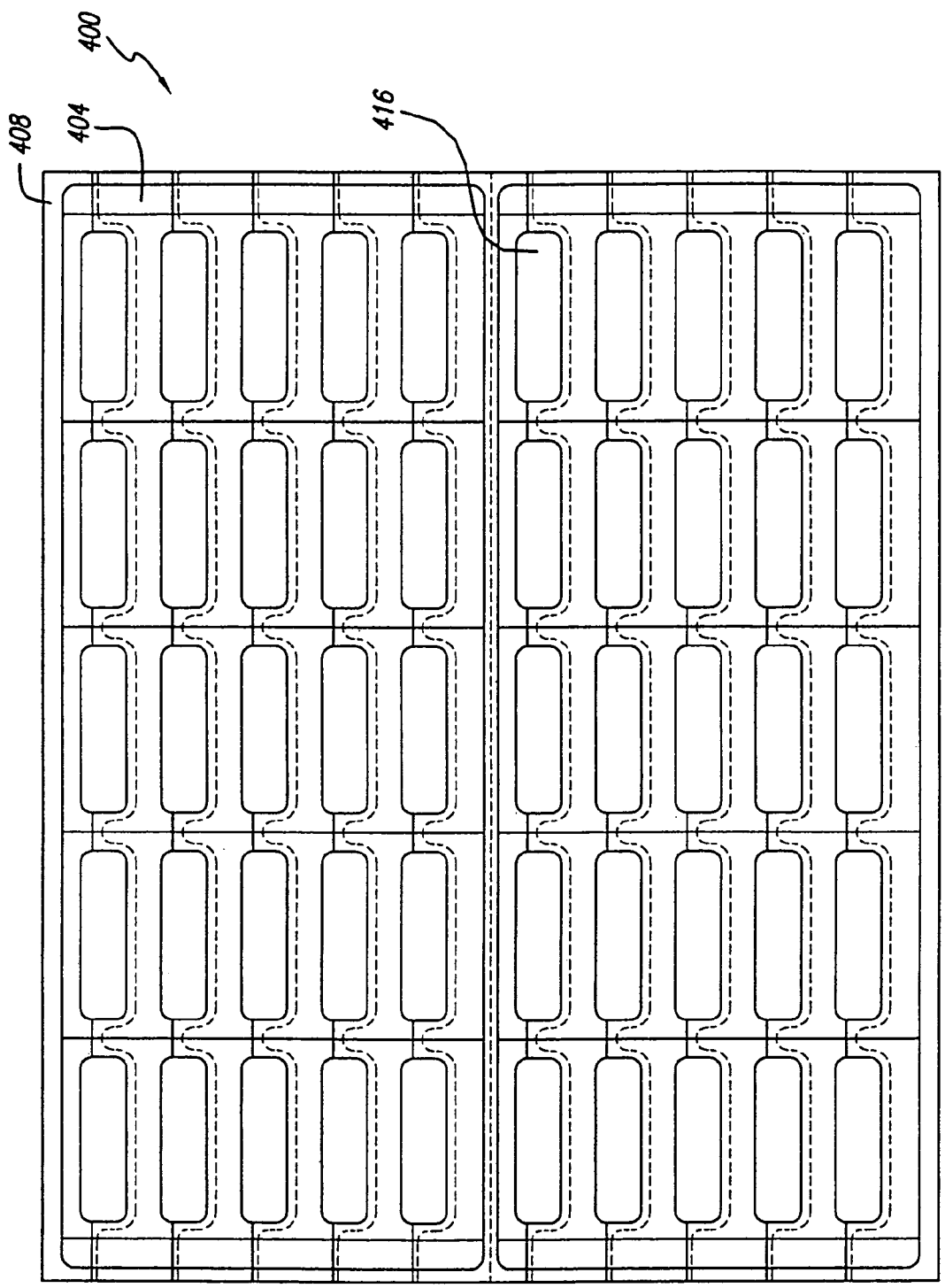
FIG. 20 is a front view of a preferred alternative embodiment of the third label applicator construction.

The fourth embodiment of FIG. 20, shown generally at 400, is an improvement over the embodiment of FIG. 13, and a number of small differences are apparent. It similarly includes facestock 404, liner sheet 408, adhesive, and cut lines to form labels 416, strips, etc. One of the differences is that there is an increased offset between the face and liner cuts. Also, there are more rounded corners, additional ties are provided on the faces, additional ties are provided on the liners and additional rows of labels are provided. The face cuts are provided to relax the post-laser curl in laser printers.

Figure 21:
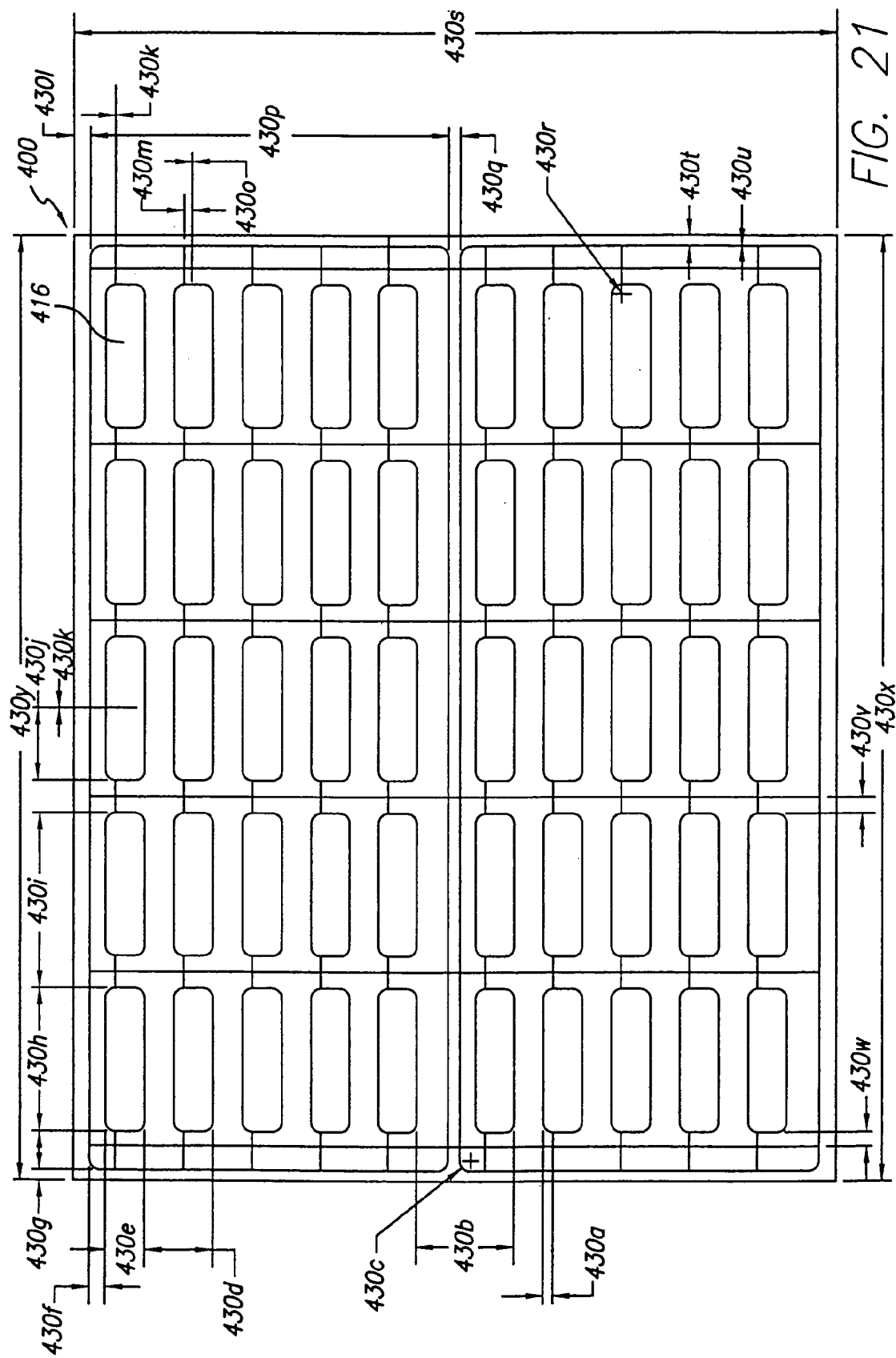
FIG. 21 is a view similar to FIG. 20 but with dimensions indicated thereon.

Referring to FIG. 21, preferred dimensions in inches are: 430a (0.063), 430b (1.251), 430c (R0.125 typical), 430d (0.750), 430e (0.438 typical), 430f (0.219), 430g (0.547), 430h (1.656 typical), 430i (2.031 typical), 430j (0.824 typical (this half of sheet only)), 430k (0.006 first row 0.008 second, third row; 0.010 fourth row tie typical (this half of sheet only)), 430l (0.187 ref.), 430m (0.094 typical), 430n (0.010 tie typical both sides), 430o (0.006 tie typical both sides), 430p (4.025 typical), 430q (0.075), 430r (R0.109 typical), 430s (8.500 web width ref.), 430t (0.063 typical), 430u (0.010 tie typical both ends), 430v (0.188 typical), 430w (0.188 typical), 430x (10.875) and 430y (11.000)

It can be seen that ten cavities are provided across by five around at 1.656 inches by 0.438 inch. Five ties per cavity as are provided on one-half of the sheet, and four ties per cavity on the other half of the sheet. The two surrounding cavities are 10.875 inches by 4.025 inches. The 1.5 mil polyester face is cut through to the 3.0 mil paper liner.

Figure 22:
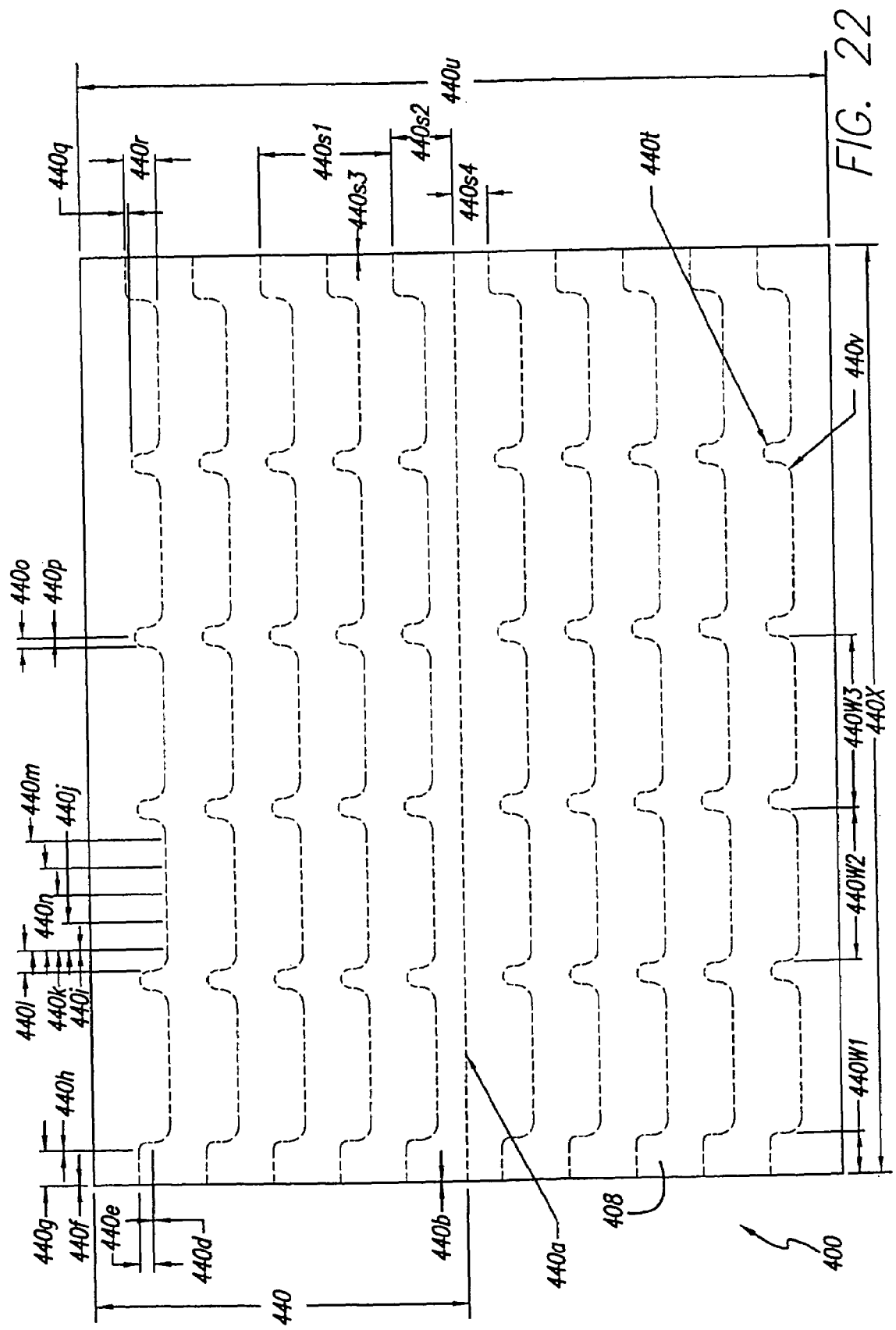
FIG. 22 is a rear view the embodiment of FIG. 20 with dimensions indicated thereon.

Referring to FIG. 22, preferred dimensions in inches are: 440a (⅛" cut×1/32" tie), 440b (0.031), 440c (4.250), 440d (0.015 tie typical both ends each repeat), 440e (0.235 both ends), 440f (0.031 tie typical), 440g (0.366), 440h (0.015 tie typical both ends), 440i (0.015 tie typical), 440j (0.313 typical), 440k (0.625 typical), 440l (0.243 typical), 440m (1.250 typical), 440n (0.938 typical), 440o (0.133 typical), 440p (0.015 tie typical), 440q (0.375 typical), 440r (0.437 typical), 440s1 (1.500), 440s2 (0.750 typical), 440s3 (0.031), 440s4 (0.500), 440t (R0.125 typical), 440u (8.500 web width), 440v (R0.188 typical), 440w1 (0.531 typical), 440w2 (1.750 typical), 440w3 (2.031 typical), 440x (10.938) and 440y (11.000 circumference)

Figure 23:
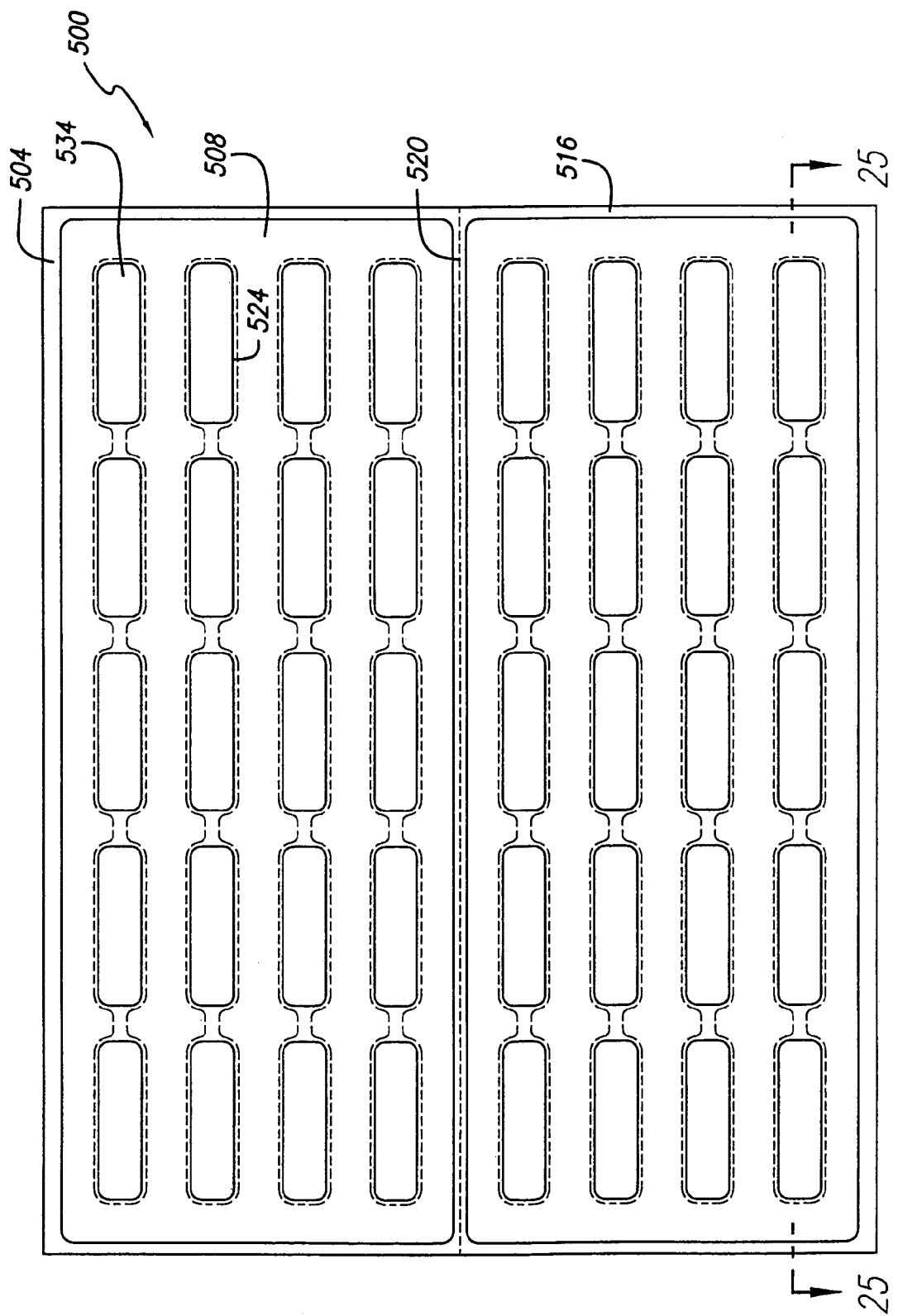
FIG. 23 is a front view of a fourth label applicator construction of the present invention.
Figure 24:
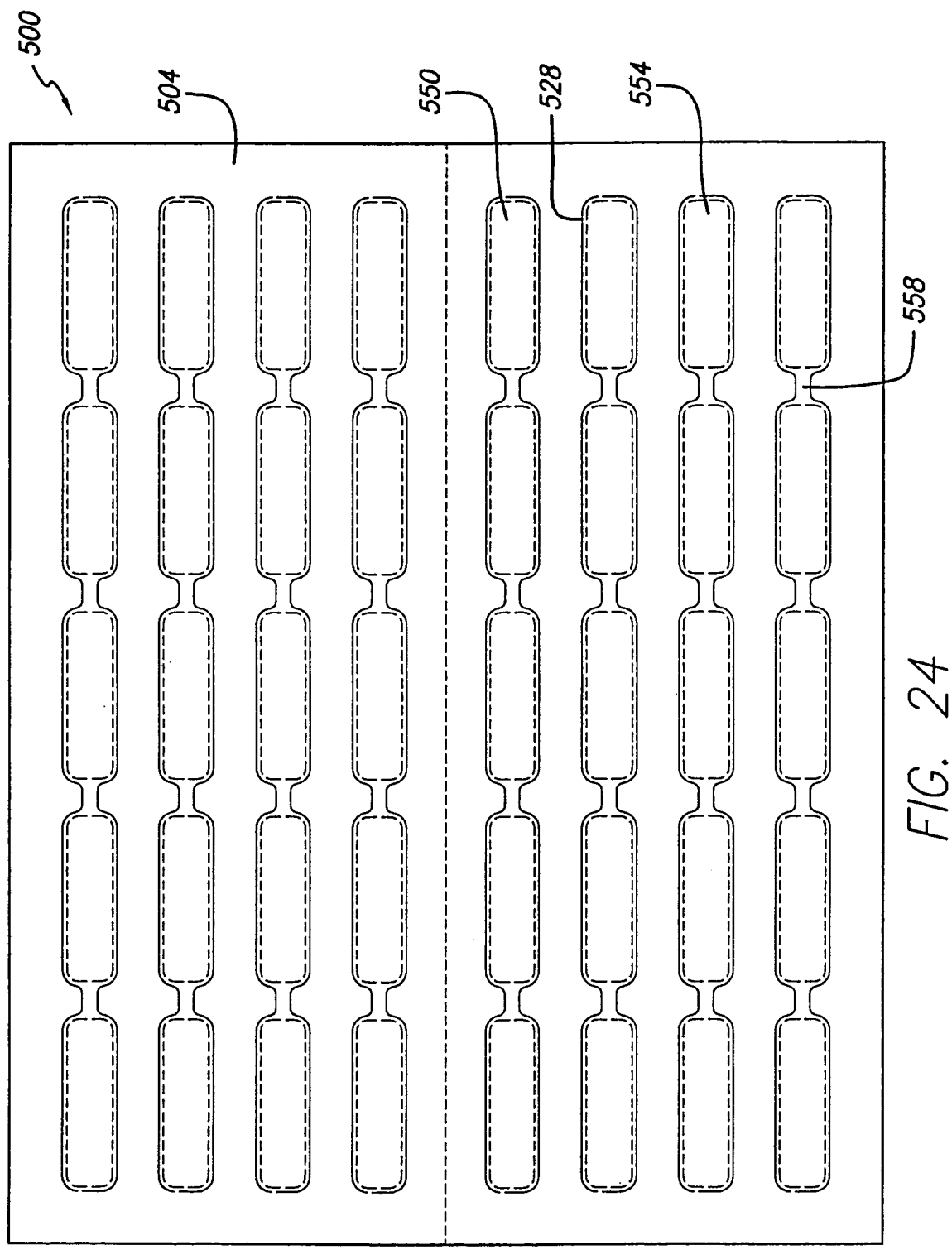
FIG. 24 is a rear view thereof.
Figure 25:
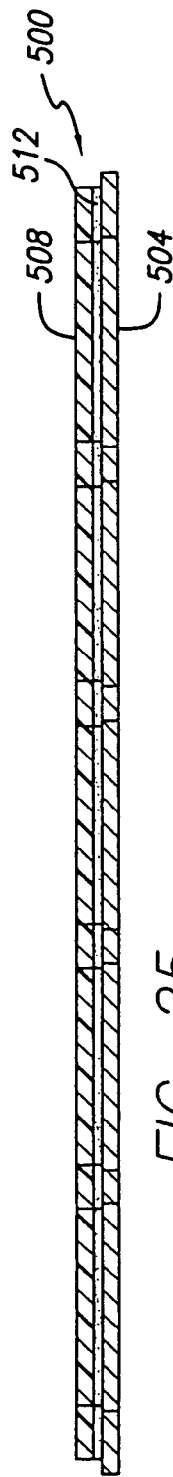
FIG. 25 is an enlarged cross-sectional view taken on line 25—25 of FIG. 23.

Referring to FIGS. 23 through 30, a fifth label applicator construction of the present invention is shown generally at 500. It similarly includes the back liner sheet 504 and the facestock 508 adhered to a front surface thereof with adhesive 512, as shown in FIG. 25. Similarly, margin 516 and the center gutter portion 520 of the facestock have been cut and removed. Die cut lines 524, 528 are formed in both the liner sheet to but not through the facestock and through the facestock to but not through the liner sheet. The die cut lines 524 through the facestock form parallel rows of spaced rounded rectangular labels 534. For example, as shown in FIG. 23, eight rows of five labels are formed. Thin breakable facestock necks separate adjacent labels in each row.

The die cut lines 528 in the liner sheet 504 form a plurality of liner strips 550, each of the strips is comprised of a series of rectangular liner sheet portions 554 connected at the center ends to the adjacent liner sheet portions with necks 558. Each of the liner sheet portions 554 has the same shape but with slightly larger dimensions than the underlying and attached facestock label 534. The liner sheet necks 558 provide sturdy connections between the liner sheet portions 554 such that the entire strip 550 can be removed without the liner sheet portions 554 separating. It is removed after the sheet has been passed through a printer 170 and the indicia 560 printed on the top surfaces of the facestock labels as depicted in FIG. 26.

Figures 27, 28:
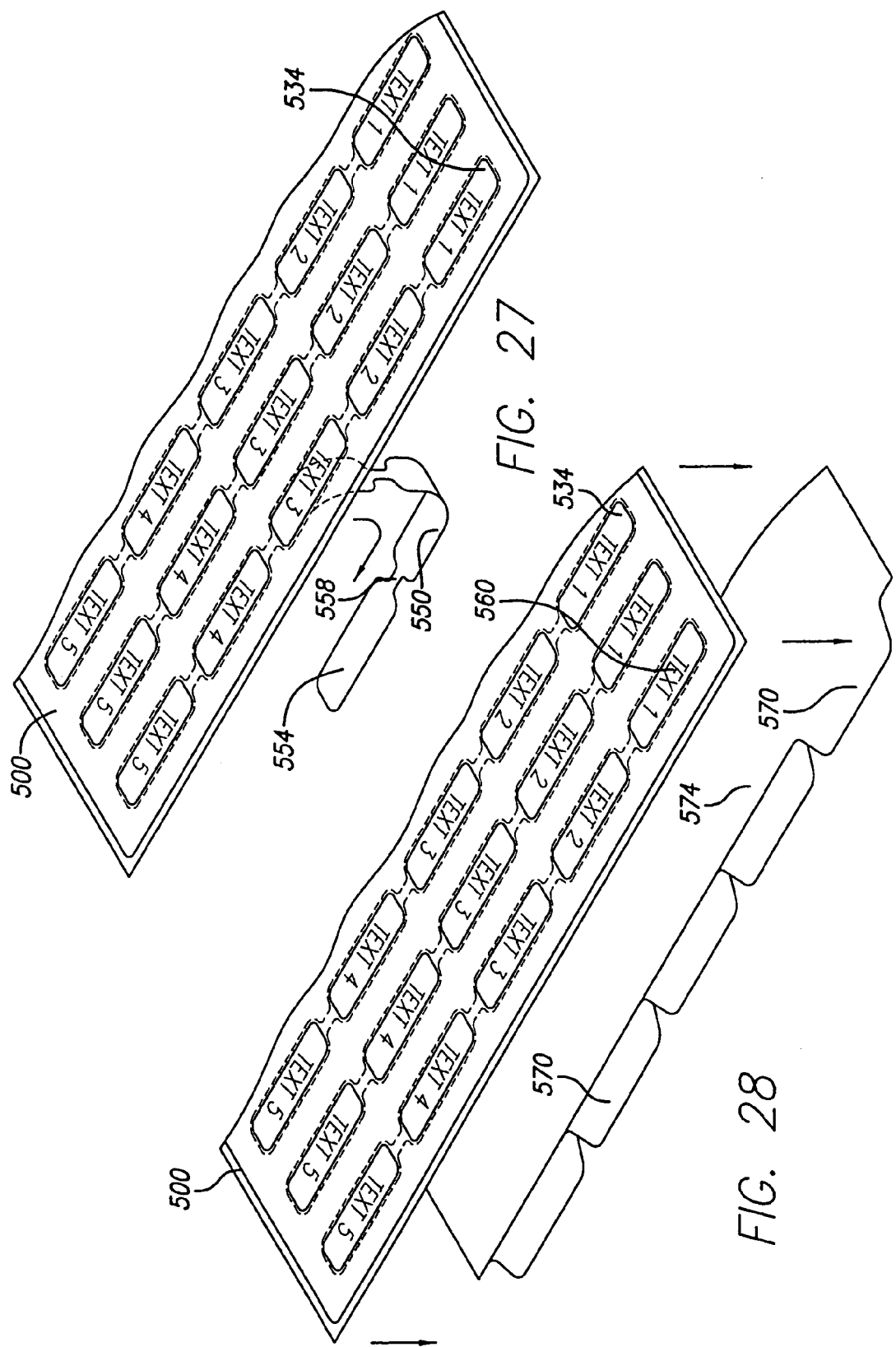
FIG. 27 is a perspective view of a top portion of the printed construction of FIG. 26 showing a first step for applying a first series of printed labels thereof.
FIG. 28 is a perspective view of a second step.

In other words, the liner sheet strip 550 is peeled off or removed from the sheet, leaving the exposed backsides of the respective adhesive labels 534. The sheet can then be manipulated such that the exposed backsides of the labels 534 are positioned on the respective stacked and staggered tabs 570 of the dividers or file folders 574 as shown in FIG. 28. The labels 534 are pressed down into position to provide a firm, straight adhesion of the labels to the tabs 570, as depicted in FIG. 29. The remainder of the sheet 578 is then pulled off of the labels 534 as shown in FIG. 30, leaving them properly applied on the tabs.

Figure 31:
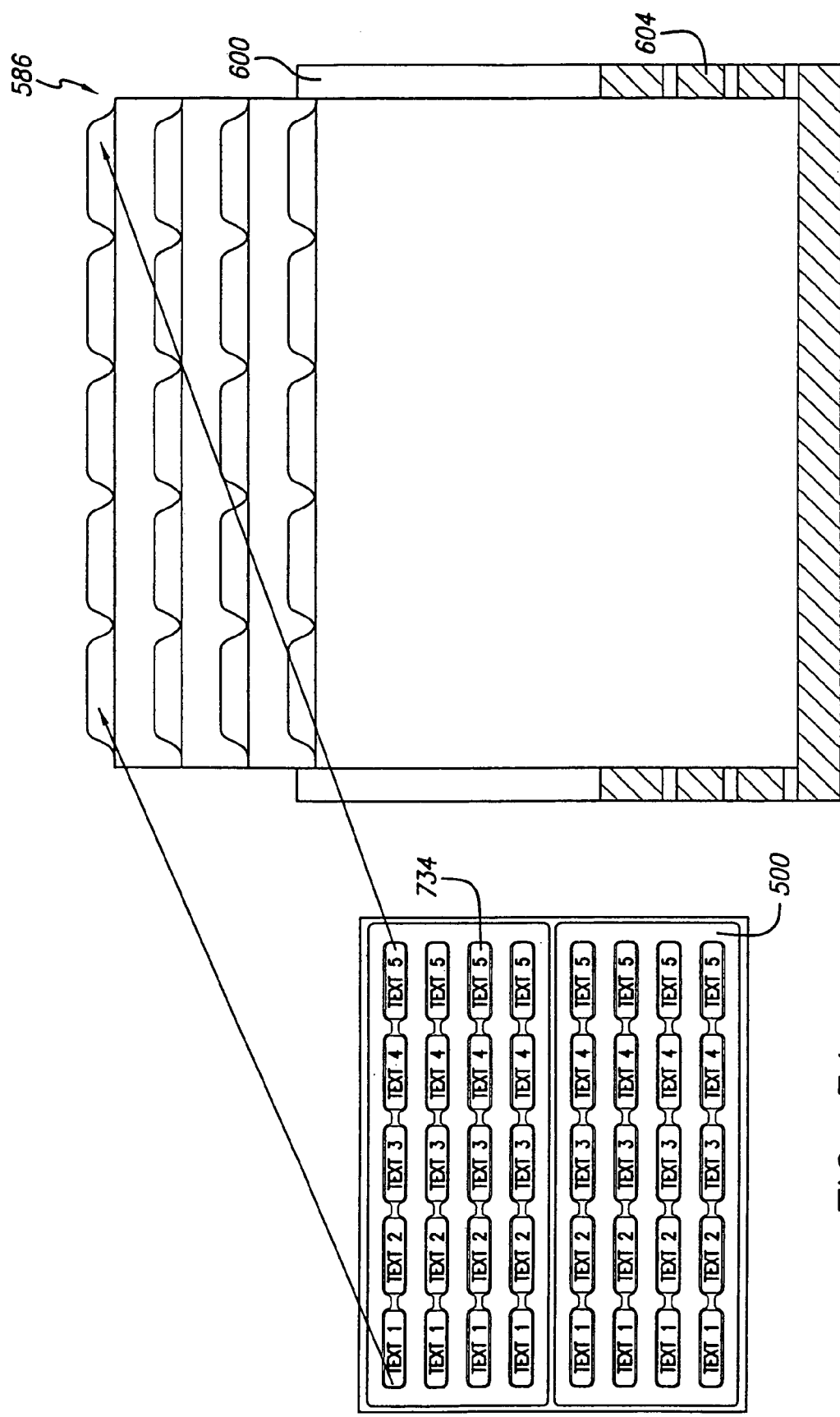
FIG. 31 is a partially cross-sectional view showing an envelope or pouch of the present invention holding a plurality of offset-stacked sets of dividers ready for application of printed labels from a label construction such as that of FIG. 23 or 28.

An advantage of construction of 500 is that more than one row of labels can be applied at the same time by removing more than one of the liner strips 534. A system for doing this is shown in FIG. 31, where, for example, four rows of printed labels can be applied at the same time to four sets of dividers 586. If the dividers 586 are offset or stacked in a stepped fashion relative to one another, a method for doing this consistently and accurately and holding the sets in this offset position is shown by the pouch 600 of FIG. 31. The pouch 600 has a series of staggered pockets 604, each for holding a respective set of dividers 586.

In other words, FIG. 31 shows a system of placing four rows of labels on tab dividers in a single step. The label sheet construction can be the sheet 500, for example, or constructions as illustrated herein as would be apparent to those skilled in the art. The tab dividers 586 are placed in the unique pouch 600 of the present invention, which positions them in a staggered layout. The pouch 600 can be made from a sheet of paper with several pockets 604 of the same material, glued on the body of the pouch by adhesive. The paper will preferably be ninety pound index or higher basis weight material that can be durable as sensitive dividers are placed in and out of the pouches. This pouch 600 speeds the label application process where numbers of different sets of dividers must be labeled as part of a single operation. This speeds the labeling operation and helps ensure accurate alignment and placement of the labels with minimal user handling.

Examples of materials usable for the label applicator constructions disclosed herein are for the clear film label for laser printers: the facestock can be 1.5 mil polyester with laser topcoating, the adhesive can be permanent acrylic adhesive, and the liner can be 3.4 mil paper release liner. For the clear film label for inkjet printers, the facestock can be 1.5 mil polyester with inkjet top coating, the adhesive can be permanent acrylic adhesive, and the liner can be 3.4 mil paper release liner. Alternatives range from using ink and toner receptive facestock material to using both permanent and removable adhesives. As an example for paper labels, the facestock can be 4.0 mil paper facestock, the adhesive can be acrylic emulsion and the liner can be 2.8 mil paper liner.

Figure 32:
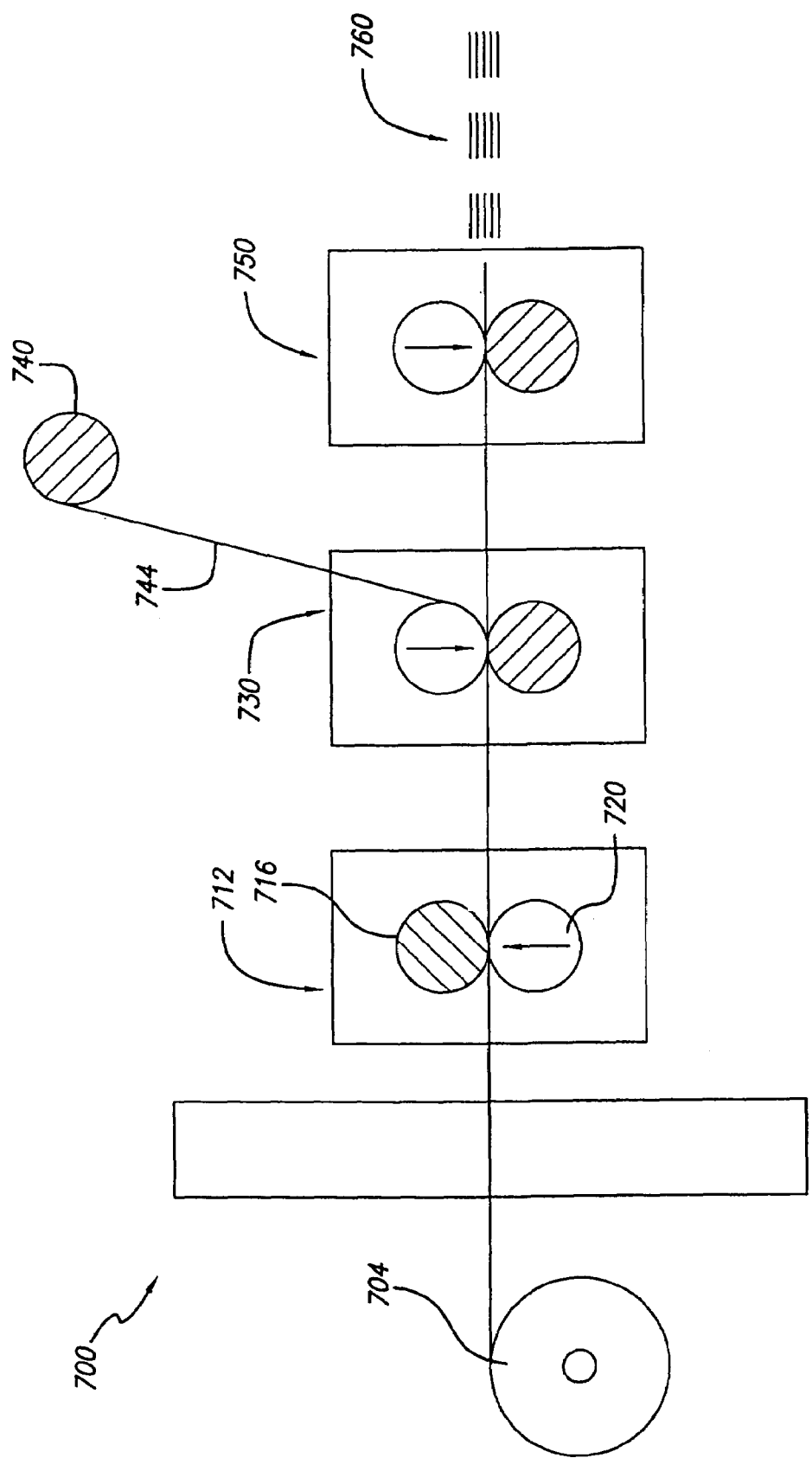
FIG. 32 is a schematic view showing a manufacturing process of a label applicator construction of the present invention.

A manufacturing process of the present invention as shown schematically in FIG. 32 at 700. Referring thereto, the material is a laminate consisting of an ink and/or laser receptive top coated facestock laminated via pressure sensitive adhesive to a release coated paper liner. The facestock can be ink or toner receptive paper or film. The adhesive can be any acrylic emulsion, solvent or hot melt pressure sensitive adhesive that is permanent or removable. And the release liner is a release coated liner. It is supplied in roll form 704 for converting into label sheets. The converting operation may or may not include printing, which generally speaking is not critical to the function or application of the label product.

The material is web fed through the converting press, such as the Mark Andy 4120, so as to pass through an initial rotary die station 712 that, when and where the product requires it, cuts through the liner but not through the polyester facestock. The anvil roller 716 is on top and the cutting die 720 is below at this station, as shown in the drawing. The rotary die that is in the initial die station may or may not include a perforation blade, which makes intermittent cut through the liner along the center of the web.

The web may or may not be turned over before it is passed through a second rotary die station 730 that, where the product requires it, cuts through the polyester facestock but not through the liner. The web then passes through a matrix removal station 740 that lifts and removes a section of the face material 744 which typically includes, but is not limited to, the perimeter around the label sheet and may or may not include a strip removed from the center of the sheet that coincides with the perforation in the liner.

Finally, the web passes through a sheeting station 750, which uses one or more cross-directional blades to cut the web into individual sheets. The sheets are fed into a packaging/collating station 760, which includes a stacker, which stacks the sheets one on top of the other into predetermined count stacks. The individual stacks are either fed into a collator, or fed into a packaging area, where they are packaged in bulk for later collation with other materials.

From the foregoing detailed description, it will be evident that there are a number of changes, adaptations and modifications of the present invention which come within the province of those skilled in the art. For example, the labels, instead of being passed through a printer or copier, are written directly thereon by a pencil, pen or the like, or the labels are provided on the sheet with the indicia pre-printed. Or the labels can be unprinted color coded labels. Another alternative is for the labels when on the sheet to not have adhesive thereon but rather to be detached or removed and then attached to an adhesive surface. However, it is intended that all such variations not departing from the spirit of the invention be considered as within the scope thereof.

What is claimed is:

1. A label applicator kit, comprising:
    a holder including first holding means for holding a first set of tabbed materials such that the tabs of the first set are staggered, exposed and in a first line and second holding means for holding a second set of tabbed materials such that the tabs of the second set are staggered, exposed and in a second line that is parallel to and spaced from the first line;
    the holder being in a sets-holding condition when the first holding means is holding the first set and the second holding means is holding the second set;
    a label applicator sheet including first and second rows of labels; and
    the label applicator sheet being configured and capable of being positioned in a label application position relative to the holder, when the holder is in the sets-holding condition, wherein each of the labels of the first row of labels is aligned with and can be applied directly to a respective tab of the first set and each of the labels of the second row of labels is aligned with and can be applied directly to a respective tab of the second set.

2. The kit of claim 1 wherein the label applicator sheet includes a liner sheet and a facestock sheet adhered to a top of the liner sheet, the facestock sheet having weakened separation lines defining the labels and the liner sheet having liner sheet portions removable to expose adhesive coated backs of the labels.

3. The kit of claim 2 wherein the adhesive coated backs of the labels are exposed when the label applicator sheet is in the label application position.

4. The kit of claim 2 wherein the liner sheet portions comprise a first liner sheet strip for the first row of labels and a second liner sheet strip for the second row of labels.

5. The kit of claim 2 wherein the liner sheet includes liner sheet neck portions interconnecting adjacent ones of the liner sheet portions.

6. The kit of claim 3 wherein the liner sheet portions and the neck portions form a first strip removable to expose the adhesive coated backs of the first row of labels and a second strip removable to expose the adhesive coated backs of the second row of labels.

7. The kit of claim 1 wherein the first set of tabbed materials is a first set of tabbed dividers and the second set of tabbed materials is a second set of tabbed dividers.

8. The kit of claim 1 wherein the first set of tabbed materials is a first set of tabbed file folders and the second set of tabbed materials is a second set of tabbed file folders.

9. The kit of claim 1 wherein the holder includes third holding means for holding a third set of tabbed materials such that the tabs of the third set are staggered, exposed and in a third line that is parallel to and spaced from the first and second lines, and the holder is in the sets-holding condition when the third holding means is holding the third set.

10. The kit of claim 7 wherein the label applicator sheet includes a third row of labels, and when in the label application position, the label applicator sheet is positioned such that each of the labels of the third row of labels is aligned with and can be directly applied to a respective tab of the third set.

11. A label applicator system, comprising:
    a holder including a plurality of connected staggered pockets;
    each of the pockets holding a different set of file folders or tab dividers, each of the sets having aligned staggered tabs, so that the sets are held in stair-step relationship with the staggered tabs of each set being exposed and parallel relative to tabs of the other sets; and
    a label applicator sheet having a plurality of labels aligned in a plurality of rows, the label applicator sheet being configured and capable of being positioned in a label application position relative to the holder, such that labels of each of the rows are positioned in label application positions aligned with respective tabs of a respective one of the sets.

12. The system of claim 11 wherein the label applicator sheet includes a liner sheet and a facestock sheet adhered to a top of the liner sheet, the facestock sheet having weakened separation lines defining the labels and the liner sheet having liner sheet portions removable to expose adhesive coated backs of the labels.

13. The system of claim 12 wherein the adhesive coated backs of the labels are exposed when the label applicator sheet is in the label application position.

14. The system of claim 12 wherein the liner sheet portions comprise liner sheet strips for each of the rows of labels.

15. The system of claim 12 wherein the liner sheet includes liner sheet neck portions interconnecting adjacent ones of the liner sheet portions.

16. The system of claim 15 wherein the liner sheet portions and the neck portions form a first ship removable to expose The adhesive coated backs of the first row of labels and a second strip removable to expose the adhesive coated backs of the second row of labels.

17. The system of claim 11 Wherein the holder is a pouch.

18. The kit of claim 1 wherein the holder is a pouch, the first holding means is a first pocket of the pouch and the second holding means is a second pocket of the pouch.

* * * * *